US011856331B1

(12) United States Patent
Campbell

(10) Patent No.: US 11,856,331 B1
(45) Date of Patent: Dec. 26, 2023

(54) EXTRACTING AND TRANSMITTING VIDEO ANALYSIS METADATA FOR A REMOTE DATABASE

(71) Applicant: WAYLENS, INC., Cambridge, MA (US)

(72) Inventor: Jeffery R. Campbell, Warkworth (CA)

(73) Assignee: WAYLENS, INC., Cambridge, MA (US)

( * ) Notice: Subject to any disclaimer, the term of this patent is extended or adjusted under 35 U.S.C. 154(b) by 902 days.

(21) Appl. No.: 15/591,459

(22) Filed: May 10, 2017

(51) Int. Cl.
| | | |
|---|---|---|
| *H04N 7/18* | (2006.01) | |
| *H04W 40/22* | (2009.01) | |
| *G06F 16/78* | (2019.01) | |
| *G06F 16/9537* | (2019.01) | |
| *G06V 20/40* | (2022.01) | |
| *G06V 20/62* | (2022.01) | |
| *H04W 4/80* | (2018.01) | |

(52) U.S. Cl.
CPC ......... *H04N 7/181* (2013.01); *G06F 16/7867* (2019.01); *G06F 16/9537* (2019.01); *G06V 20/46* (2022.01); *G06V 20/63* (2022.01); *H04W 40/22* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 8,825,597 B1* | 9/2014 | Houston | ................. | H04L 67/06 707/610 |
| 9,779,309 B1* | 10/2017 | Fink | .................... | G06F 16/7867 |
| 9,779,562 B1* | 10/2017 | Cook | ................... | G07C 5/0808 |
| 10,455,185 B2* | 10/2019 | Bostick | .................. | H04N 7/188 |
| 2007/0094275 A1* | 4/2007 | Fanning | ................. | H04L 67/61 |
| 2008/0271098 A1* | 10/2008 | Kalaboukis | ........ | H04N 21/8106 725/109 |
| 2013/0330055 A1* | 12/2013 | Zimmermann | .... | H04N 21/8193 386/240 |
| 2015/1458991 | 9/2014 | Russell | .................. | H04N 7/181 |

(Continued)

OTHER PUBLICATIONS

Ken Belson, "The Wired Repo Man: He's Not 'As Seen on TV'", http://www.nytimes.com/2010/02/28/automobiles/28REPO.html;Feb. 26, 2010, pp. 1-3.

(Continued)

*Primary Examiner* — Ricky Chin
(74) *Attorney, Agent, or Firm* — Christopher P. Maiorana, PC

(57) ABSTRACT

A system comprising a capture device and a database. The capture device may be configured to (i) capture video, (ii) perform video analysis to extract metadata corresponding to the captured video and (iii) communicate with a wireless communication device. The database may be configured to (i) communicate with the wireless communication device, (ii) store the metadata received from the wireless communication device, (iii) generate search results for a user based on the metadata and (iv) provide the user at least one of (a) the metadata and (b) the captured video based on the search results. The metadata may be used to determine license plates present in the captured video. The capture device may transmit the captured video to the database via the wireless communication device based on a request by the user.

20 Claims, 14 Drawing Sheets

(56) References Cited

U.S. PATENT DOCUMENTS

| | | | | |
|---|---|---|---|---|
| 2015/0145991 | A1* | 5/2015 | Russell | G06Q 10/103 |
| | | | | 348/143 |
| 2016/0295089 | A1* | 10/2016 | Farahani | G07C 5/008 |
| 2017/0230605 | A1* | 8/2017 | Han | H04N 5/772 |
| 2017/0277597 | A1* | 9/2017 | Dillon | G06F 11/1464 |
| 2017/0302879 | A1* | 10/2017 | Tokunaga | H04W 4/80 |
| 2017/0323540 | A1* | 11/2017 | Boykin | G08B 13/19613 |

OTHER PUBLICATIONS

Gil Aegerter, "License plate data not just for cops: Private companies are tracking your car", https://www.nbcnews.com/news/other/license-plate-data-not-just-cops-private-companies-are-tracking-f6C10684677.Jul. 19, 2013, pp. 1-5.

Lora Kolodny, "Nauto raises $12 million for driverless car technology that's street-legal today", https://techcrunch.com/2016/04/13/nauto-raises-12-million-for-driverless-car-technology-thats-street-legal-today/Apr. 13, 2016, pp. 1-2.

* cited by examiner

US 11,856,331 B1

EXTRACTING AND TRANSMITTING VIDEO ANALYSIS METADATA FOR A REMOTE DATABASE

FIELD OF THE INVENTION

The invention relates to video capture generally and, more particularly, to a method and/or apparatus for implementing extracting and transmitting video analysis metadata for a remote database.

BACKGROUND

Dashboard cameras (i.e., dashcams) and other vehicle-mounted cameras are becoming increasingly popular. Video footage captured by a vehicle-mounted camera can be used for safety, insurance claim investigation and incident recreation. Not all vehicles are equipped with vehicle-mounted cameras. Video quality of cameras can vary and storage space is limited. Without vehicle-mounted cameras capable of performing onboard video analytics important events can be missed (i.e., car accidents). Even when the driver records an event, the driver only has one camera-angle.

Industry and government license plate databases hold a lot of historical data that provides limited usefulness. Current data in databases is limited to license plates and corresponding still pictures along with location and time information. The information is gathered from expensive systems developed for police and automobile repossession agents that employ spotter cars or tow truck drivers. Most drivers do not have access to license plate database information or access to video-mounted camera footage.

It would be desirable to implement extracting and transmitting video analysis metadata for a remote database.

SUMMARY

The invention concerns a system comprising a capture device and a database. The capture device may be configured to (i) capture video, (ii) perform video analysis to extract metadata corresponding to the captured video and (iii) communicate with a wireless communication device. The database may be configured to (i) communicate with the wireless communication device, (ii) store the metadata received from the wireless communication device, (iii) generate search results for a user based on the metadata and (iv) provide the user at least one of (a) the metadata and (b) the captured video based on the search results. The metadata may be used to determine license plates present in the captured video. The capture device may transmit the captured video to the database via the wireless communication device based on a request by the user.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing extracting and transmitting video analysis metadata for a remote database that may (i) implement vehicle-mounted cameras configured to perform local video analytics, (ii) generate metadata corresponding to captured video, (iii) store metadata received from multiple vehicles, (iv) provide a searchable database of video metadata, (v) enable users to locate and purchase video footage, (vi) enable users to receive payments for providing video footage, (vii) provide map interfaces to enable users to search available video footage and metadata, (viii) enable users to request video footage based on search results, (ix) enable trickle uploading of video data on demand, (x) transfer data from a vehicle-mounted camera to a database via a user communication device, (xi) be implemented on a cloud-based database and/or (xii) use data effectively.

License Plate Recognition (e.g., LPR) technology may be configured to read information from a license plate on a vehicle. Cameras may be implemented to perform license plate recognition and/or object character recognition (OCR). In some embodiments, cameras used for performing license plate recognition may be stationary (e.g., permanently and/or semi-permanently mounted to a fixture such as a lamp post, a building, a street light, etc.). In some embodiments, cameras used for performing license plate recognition may be mobile (or attached to a moving object).

Figure 1:
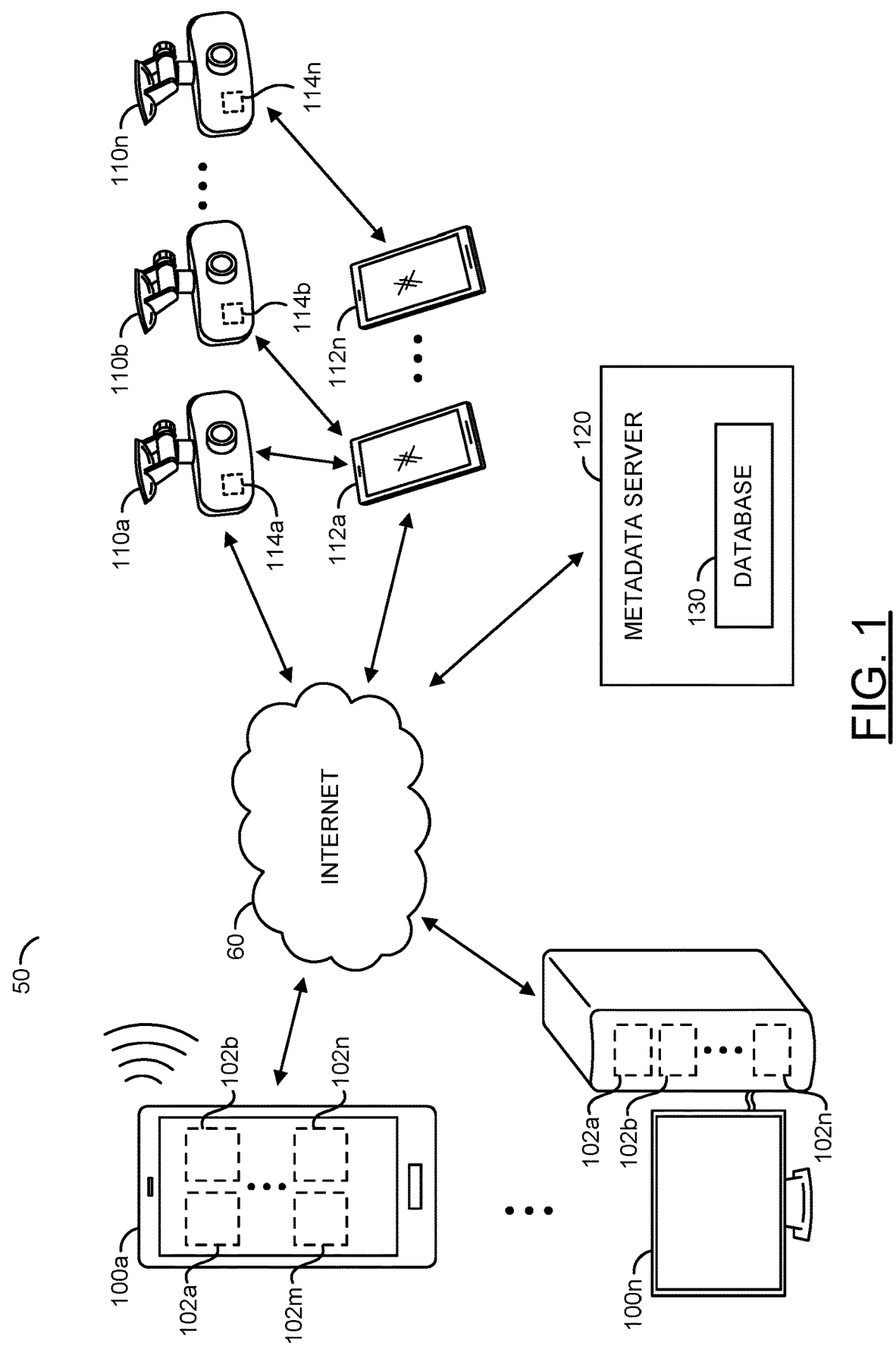
FIG. 1 is a diagram illustrating an example system in accordance with an embodiment of the present invention.

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement subscriber devices (e.g., subscriber communication devices). The blocks 110a-110n may implement video capture devices. The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 100a-100n and/or the user devices 112a-112n may be configured to execute computer readable instructions (e.g., executable programs, apps, binaries, etc.). For example, the subscriber devices 100a-100n and/or the user devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 100a-100n and/or the user devices 112a-112n may be implemented as a vehicle capable of 3G/4G/LTE/5G communication (e.g., a vehicle with a touchscreen infotainment system). Generally, the subscriber devices 100a-100n and/or the user devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 100a-100n and/or the user devices 112a-112n may have similar implementations. For example, the user devices 112a-112n may be wireless communication devices. The type and/or features of the subscriber devices 100a-100n and/or the user devices 112a-112n may be varied according to the design criteria of a particular implementation.

Each of the subscriber devices 100a-100n may be configured to connect to the network 60 (e.g., hard-wired, Wi-Fi, etc.). The subscriber devices 100a-100n may be configured to store and/or execute the computer readable instructions 102a-102n. Executing the computer readable instructions 102a-102n may enable the subscriber devices 100a-100n to display various interfaces, generate output and/or receive input. For example, the app 102a may be a front-end for interacting with the system 50.

Each of the capture devices 110a-110n may be configured to capture video data. In some embodiments, the capture devices 110a-110n may be implemented as vehicle-mounted cameras (e.g., dashcams) to record video while a user drives the vehicle. In one example, each vehicle may be equipped with one of the capture devices 110a-110n. In another example, one vehicle may be equipped with more than one of the capture devices 110a-110n (e.g., to capture multiple fields of view and/or perspectives from the vehicle). In some embodiments, the capture devices 110a-110n may be cameras mounted at stationary locations (e.g., security cameras mounted on buildings). The implementation of the capture devices 110a-110n may be varied according to the design criteria of a particular implementation.

In some embodiments, the capture devices 110a-110n may be configured to communicate directly with the network 60. For example, the capture devices 110a-110n may comprise components implementing Wi-Fi communication and/or 3G/4G/LTE/5G (e.g., cellular) communication. In some embodiments, the capture devices 110a-110n may be configured to communicate indirectly with the network 60. For example, the capture devices 110a-110n may comprise short-range communication such as Bluetooth and/or Wi-Fi (e.g., short-range communication to a tethered device such as a smartphone). A cost of manufacturing the capture devices 110a-110n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 110a-110n may be lower when Bluetooth alone and/or Bluetooth/Wi-Fi is implemented compared to a camera that implements 3G/4G/LTE/5G hardware. Implementing the capture devices 110a-110n with a low cost may enable users to buy more than one of the capture devices 110a-110n and/or provide a larger user base. When the system 50 has more of the capture devices 110a-110n available to capture video data and/or provide metadata, more data points may be available for analysis. Generally, having more data points enables more useful analytical results generated by the system 50. In some embodiments, the capture devices 110a-110n may comprise a display and/or an input interface. For example, the capture devices 110a-110n may be configured to run apps (e.g., the computer executable instructions 102a-102n). In another example, the capture devices 110a-110n may be implemented as smartphones configured as cameras.

Each of the user devices 112a-112n may be configured to connect to the network 60 and/or the capture devices 110a-110n. In one example, the user devices 112a-112n may implement wireless communication devices. The user devices 112a-112n may comprise components configured to implement a wide area network connection (e.g., Wi-Fi) and/or local, device-to-device connections (e.g., Bluetooth, ZigBee, Z-Wave, etc.). For example, the user devices 112a-112n may implement a Wi-Fi and/or 3G/4G/LTE/5G connection to the internet 60 and a Bluetooth and/or Wi-Fi connection to one or more of the capture devices 110a-110n. In some embodiments, the user devices 112a-112n may be configured to send/receive data to/from the internet 60. For example, the user devices 112a-112n may receive data (e.g., video data, metadata, etc.) from one or more of the capture devices 110a-110n and transmit the data to the internet 60. In another example, the user devices 112a-112n may receive data (e.g., data requests, interrupt requests, firmware updates, etc.) from the internet 60 and transmit the data to the capture devices 110a-110n.

Generally, the user devices 112a-112n are implemented as portable devices (e.g., carried by a person, mounted in a vehicle, battery powered, etc.). The user devices 112a-112n may be configured to execute the computer readable instructions 102a-102n. In one example, the subscriber devices 100a-100n may store and/or execute one version (e.g., a subscriber version) of an app (e.g., the computer readable instructions 102a) and the user devices 112a-112n may store and/or execute another version (e.g., a provider version) of an app (e.g., the computer readable instructions 102b). One of the user devices 112a-112n may be configured to communicate with more than one of the capture devices 110a-110n (e.g., one smartphone may connect to multiple vehicle-mounted cameras in the same vehicle). In the example shown, the smartphone 112a communicates with the capture device 110a and the capture device 110b (e.g., the driver may have the smartphone and the vehicle may have two vehicle-mounted cameras). The connections between the user devices 112a-112n and/or the capture devices 110a-110n may be varied according to the design criteria of a particular implementation.

Each of the capture devices 110a-110n may comprise a respective block (or circuit) 114a-114n. The circuits 114a-114n may implement video processor functionality. In some embodiments, the circuits 114a-114n may be a system-on-chip (SoC). For example, the circuits 114a-114n may comprise input/output, a memory, processors, etc. The components and/or functionality of the circuits 114a-114n may be varied according to the design criteria of a particular implementation.

The circuits 114a-114n may be configured to record, encode, decode, transmit and/or store video data. The circuits 114a-114n may be configured to perform video analysis and/or video analytics. For example, the circuits 114a-114n may process video, identify patterns in the video data and/or recognize objects captured by the video data. Heuristics, templates and/or comparisons may be performed by the circuits 114a-114n to recognize and/or identify objects in captured video frames (e.g., video data) as objects that can be perceived by humans. In one example, the circuits 114a-114n may identify an object as a vehicle (or part of a vehicle such as a hood, a license plate, etc.). In another example, the circuits 114a-114n may identify text, shapes and/or colors. In yet another example, the circuits 114a-114n may identify objects (e.g., signs, pedestrians, street lights, etc.). The video data captured by the circuits 114a-114n may be stored by the capture devices 110a-110n. In one example, the circuits 114a-114n may implement a memory. In another example, the circuits 114a-114n may connect to an external memory (e.g., the capture devices 110a-110n may be configured to receive a flash memory such as a SD card, a microSD card, NAND memory, Compact Flash (CF) and/or an XD card).

The circuits 114a-114n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 114a-114n may comprise a GPS unit to determine GPS coordinates, a magnetometer to determine direction of travel and/or a real time clock (RTC) circuit to determine time.

The circuits 114a-114n may be configured to detect license plates. License plates may be detected, and the alphanumeric characters and/or symbols on the license plate may be identified. The license plate alphanumeric characters and/or symbols may be extracted from the captured video data as the metadata. For example, the circuits 114a-114n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 114a-114n when the video was recorded. The circuits 114a-114n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, JavaScript, PHP, SQL, AJAX applications, APIs, etc. The server 120 may be configured to distribute apps (e.g., one or more of the computer readable instructions 102a-102n) to the subscriber devices 100a-100n and/or the user devices 112a-112n. The server 120 may be configured to generate interfaces (e.g., graphical user interfaces) based on stored data for the subscriber devices 100a-100n. For example, the server 120 may generate data to implement an interface, the data may be sent to the subscriber devices 100a-100n, the subscriber devices 100a-100n may interpret the data to generate a user interface, the user may interact with the user interface to provide requests, the subscriber devices 100a-100n may transmit the requests to the server 120 and the server may process the requests. Similarly, the capture devices 110a-110n and/or the user devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 110a-110n. In an example, the database 130 may store the metadata. Search parameters may be transmitted by the subscriber devices 100a-100n and the database 130 may be searched based on the search parameters. For example, the database 130 may enable the metadata to be associated with the video data stored by (and located on) the capture devices 110a-110n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 110a-110n to program participants (e.g., the users and/or the data producers). The data producers may install the capture devices 110a-110n. For example, the data producers may install the capture devices 110a-110n on vehicles as dashcams. The capture devices 110a-110n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 110a-110n).

The data producers may use the capture devices 110a-110n to collect and/or upload video metadata to the server 120 (e.g., for storage in the database 130). For example, the video metadata may be uploaded via the user devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 100a-100n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 100a-100n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 100a-100n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 110a-110n captured the video based on the video metadata (e.g., the metadata may comprise an ID of a camera and/or user that captured the video). The server 120 may send a request to the user devices 112a-112n and/or the capture devices 110a-110n to upload the recorded video. If the capture devices 110a-110n still have the requested video stored, a video upload may be initiated. The recorded video may be trickled (e.g., uploaded as a low priority data transfer) from the corresponding one of the capture devices 110a-110n, through the corresponding one of the user devices 112a-112n and to the internet 60. In some embodiments, the recorded video may be buffered on one of the user devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 110a-110n may be implemented with inexpensive hardware powerful enough to perform video analytics (e.g., license plate recognition (LPR)). The video analytics may be performed in real time, while capturing the video data. In one example, the capture devices 110a-110n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 110a-110n into a money making tool. For example, in the system 50 the drivers may own the capture devices 110a-110n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 110a-110n may be configured to overwrite stored video as new video data is captured (e.g., a loop recording). In an example of 40 hours of driving per week with the capture devices 110a-110n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 110a-110n. The provider of the system 50 may curate the resulting data generated by the data providers.

Figure 2:
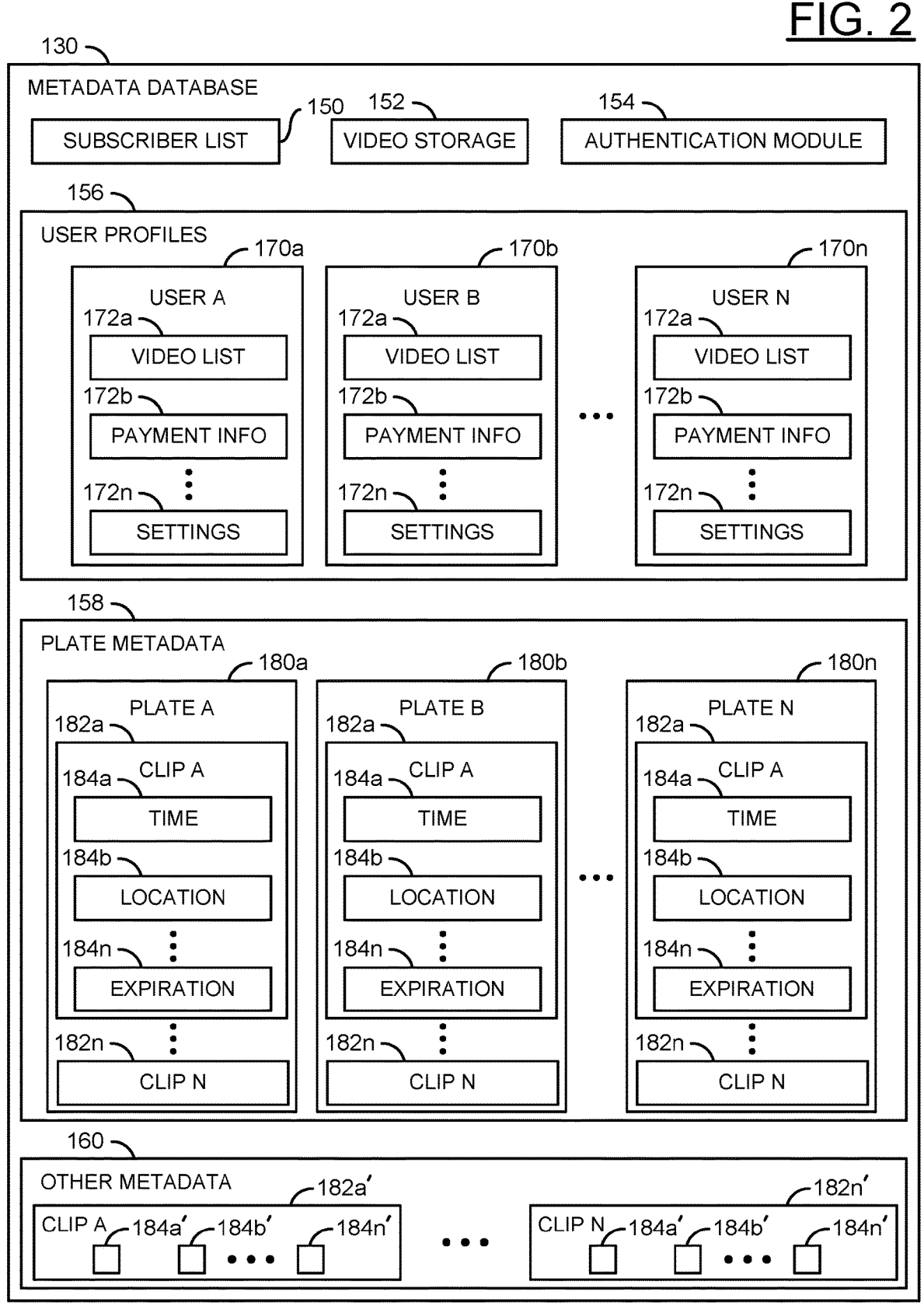
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156, a block (or circuit) 158 and/or a block (or circuit) 160. The block 150 may comprise a subscriber list. The block 152 may comprise video storage. The block 154 may comprise an authentication module. The block 156 may comprise user profiles. The block 158 may comprise plate metadata. The block 160 may comprise other metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 102a to enable the subscriber user to access the database 130 from the subscriber device 100a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 110a-110n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user devices 112a-112n may provide credentials to the database 130 to upload the video metadata and/or the recorded video. In another example, two-factor authentication may be implemented by the authentication module 154. For example, the subscriber user may log in using the subscriber devices 100a-100n by providing a username, a password, and an additional key (e.g., a text message with a passcode provided to the smartphone 100a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172a may be used to send a request to the capture devices 110a-110n and/or the user devices 112a-112n to upload the recorded video data. In another example, the video list 172a may be used to provide a payment to the particular data provider that captured the requested video data. In an example, the data set 172b may store payment information. The payment information 172b may associate credit card, electronic payment (e.g., PayPal, Bitcoin, Apple Pay, Google Wallet, etc.) and/or bank information with a particular one of the data provider users. The payment information 172b may be used to facilitate payments to the data provider that has uploaded a requested recorded video.

In some embodiments, the data provider may receive one of the capture devices 110a-110n in exchange for providing the payment information 172b and if enough video data is provided (e.g., provided on a consistent basis) the data collector user may not be charged. If the capture device is not used enough (or not used regularly, a charge may be incurred (e.g., due to inactivity). In an example, the data provider may receive one of the capture devices 110a-110n free of charge and be able to use the camera as a regular dashcam as well as for providing data for the system 50. In one example, the data provider may not be charged for one of the capture devices 110a-110n for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172b may be stored to charge a penalty fee to encourage the data provider to provide data.

In an example, the data set 172n may comprise user settings. The user settings 172n may provide a configuration and/or preferences for each of the data providers 170a-170n. The data sets 172a-172n may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172a-172n of each of the data provider profiles 170a-170n may be varied according to the design criteria of a particular implementation.

The plate metadata 158 may store information about various license plates 180a-180n. In some embodiments, each license plate that is read by the capture devices 110a-110n may be stored. Every time video metadata is uploaded to the database 130, the video metadata may be associated with the corresponding license plates 180a-180n. For example, if there is no prior license plate entry 180a-180n, a new license plate entry may be added to the plate metadata 158. In another example, if there is already a license plate entry 180a-180n, the new video data may be associated with the corresponding license plate entry 180a-180n.

Each of the license plate entries 180a-180n may comprise a number of associated clips 182a-182n. The clips 182a-182n may comprise metadata entries for each time a license plate has been read by one of the capture devices 110a-110n. For example, each time a license plate is detected, a new one of the clips 182a-182n may be appended to the corresponding one of the license plate entries 180a-180n. Each of the clips 182a-182n may comprise metadata 184a-184n. The metadata 184a-184n may comprise the video metadata.

The video metadata 184a-184n may comprise the data extracted by the capture devices 110a-110n from the video recorded by the capture devices 110a-110n and/or data associated with the video recorded by the capture devices 110a-110n. The video metadata 184a-184n may be configured to provide useful information to identify vehicles, times, locations and/or other data about the recorded videos. The video metadata 184a-184n may be the data checked by the database 130 to determine results for a search query from the subscriber users. The video metadata 184a-184n may be used to approximate what may be recorded and/or visible when viewing the corresponding recorded video.

In one example, the video metadata 184a may comprise a time. The time 184a may indicate a date and/or time of day when the corresponding video was recorded (e.g., a timestamp). The time 184a may be used to find recorded video that occurred at a particular time. In another example, the video metadata 184b may comprise a location. The location 184b may comprise GPS coordinates corresponding to the recorded video. The location 184b may be used to find recorded video that was captured at a particular location (e.g., at an intersection). In yet another example, the video metadata 184n may comprise an expiration flag. The expiration flag 184n may indicate whether or not the recorded video is still available (e.g., stored in the memory of the capture device, has not been overwritten, etc.). For example, the expiration flag 184 may have a particular value (e.g., a logical one value) if the video has been overwritten. If the expiration flag 184n indicates that the recorded video is no longer available, the video metadata 184a-184n may still provide useful information. Other types of metadata 184a-184n may be stored (e.g., a user ID of the data provider, direction of the capture devices 110a-110n, video quality of the captured video, etc.). The types and/or amount of video metadata 184a-184n may be varied according to the design criteria of a particular implementation.

The other metadata 160 may store information about various data extracted from the video data. In some embodiments, the other metadata 160 may store data in a similar arrangement as the plate metadata 158. The other metadata 160 may comprise the clips 182a'-182n'. Each of the clips 182a'-182n' may comprise general metadata 184a'-184n'. Some of the general metadata 184a'-184n' may store information similar to the metadata 184a-184n (e.g., a timestamp, location information, direction of the camera, device ID, etc.). For example, the metadata 184a-184n may correspond to metadata for the license plate entries 180a-180n and the general metadata 184a'-184n' may correspond to other information (e.g., information not related to license plate data).

The circuits 114a-114n may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition). The circuits 114a-114n may be configured to determine roadway data in real time. In one example, the general metadata 184a'-184n' may store information corresponding to a type of vehicle detected (e.g., color of a car, make of a vehicle, model of a vehicle, year of a vehicle, speed of a vehicle, etc.). In another example, the general metadata 184a'-184n' may comprise roadway data (e.g., a lamp post detected, a street sign detected, a shape of a roadway detected, conditions of the road detected, etc.). The type of information stored as the general metadata 184a'-184n' in the other metadata 160 may be varied according to the design criteria of a particular implementation.

The database 130 may be configured to index the video metadata and/or associate new video metadata with license plate numbers in real time. The database 130 may arrange the data to enable efficient filtering of information to provide fast search results for the subscriber users. In the example shown, the video metadata 184a-184n is arranged according to the license plates 180a-180n. In another example, the video metadata 184a-184n may be arranged based on a time, a location, a camera ID, etc.). The arrangement of the storage of the data in the database 130 may be varied according to the design criteria of a particular implementation.

The database 130 may be configured to create a database entry for each incoming license plate (e.g., the plates 180a-180n). In one example, the video metadata 184a-184n for one of the clips 182a-182n of the plate 180a may comprise information such as id="1", lp="5SAM333", date="20170307", time="14:30", alt="141.46354", lat="37.804440" and/or lng="−122.422874". In another example, the video metadata 184a-184n for one of the clips 182a-182n of the plate 180a may comprise information such as id="2", lp="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database may implement one file for each license plate 180a-180n to avoid parsing all stored data in order to filter out license plate results in real time.

Figure 3:
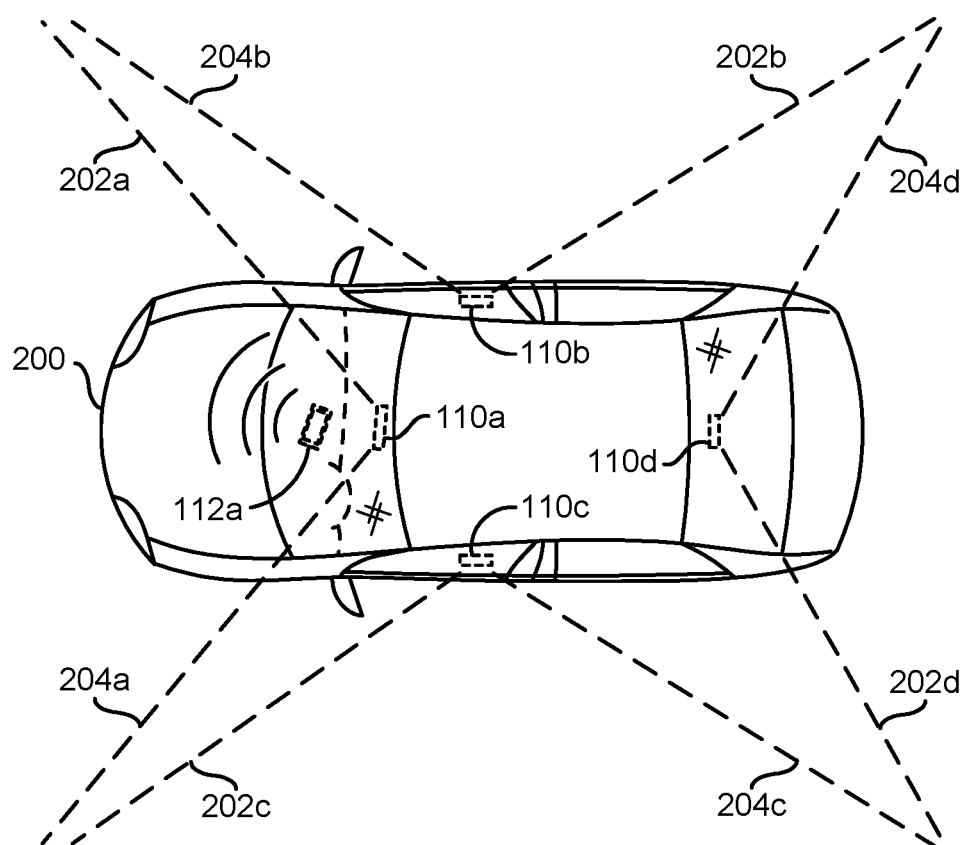
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 110a-110n. In the example shown, the capture device 110a may be installed facing the direction of travel of the vehicle 200, the capture device 110b may be installed directed away from a passenger side of the vehicle 200, the capture device 110c may be installed directed away from a driver side of the vehicle 200 and the capture device 110d may be installed directed facing opposite from the direction of travel of the vehicle 200.

The user device 112a is shown in the vehicle 200. In the example shown, the user device 112a may be a smartphone communicating to the network 60 (e.g., via a 3G/4G/LTE/5G wireless connection). For example, each of the installed cameras 110a-110d may communicate with the smartphone 112a (e.g., creating a local network) and the smartphone 112a may communicate with the external network 60. In the example shown, the capture devices 110a-110d may be positioned on the windows of the front, side and back of the vehicle 200 (e.g., suction cupped from the inside of the vehicle 200). The number, installation and/or locations of the capture devices 110a-110n in a vehicle may be varied according to the design criteria of a particular implementation and/or a preference of the data provider.

A line 202a and a line 204a are shown extending from the capture device 110a. The line 202a and the line 204a may represent a field of view captured by the capture device 110a. The field of view of the capture device 110a may record video of a view from the front of the vehicle 200 (e.g., from a perspective of a front of the vehicle 200). A line 202b and a line 204b are shown extending from the capture device 110b. The line 202b and the line 204b may represent a field of view captured by the capture device 110b. The field of view of the capture device 110b may record video of the view from the right of the vehicle 200 (e.g., from a perspective of a passenger side of the vehicle 200). A line 202c and a line 204c are shown extending from the capture device 110c. The line 202c and the line 204c may represent a field of view captured by the capture device 110c. The field of view of the capture device 110c may record video of the view from the left of the vehicle 200 (e.g., from a perspective of a driver side of the vehicle 200). A line 202d and a line 204d are shown extending from the capture device 110d. The line 202d and the line 204d may represent a field of view captured by the capture device 110d. The field of view of the capture device 110d may record video of the view from the rear of the vehicle 200 (e.g., from a perspective of a back of the vehicle 200).

The vehicle 200 may have a number of the capture devices 110a-110n installed. In the example shown, four of the capture devices 110a-110n may be installed. For example, the cameras may be directed for a "drive mode" (e.g., the camera 110a directed forward, and the camera 110d directed backwards) and the cameras may be directed for a "trawl mode" (e.g., the camera 110b and the camera 110c each directed sideways). For example, the trawl mode may be useful when in parking lots. The number of the capture devices 110a-110n installed on the vehicle 200 may be varied according to the design criteria of a particular implementation.

Figure 4:
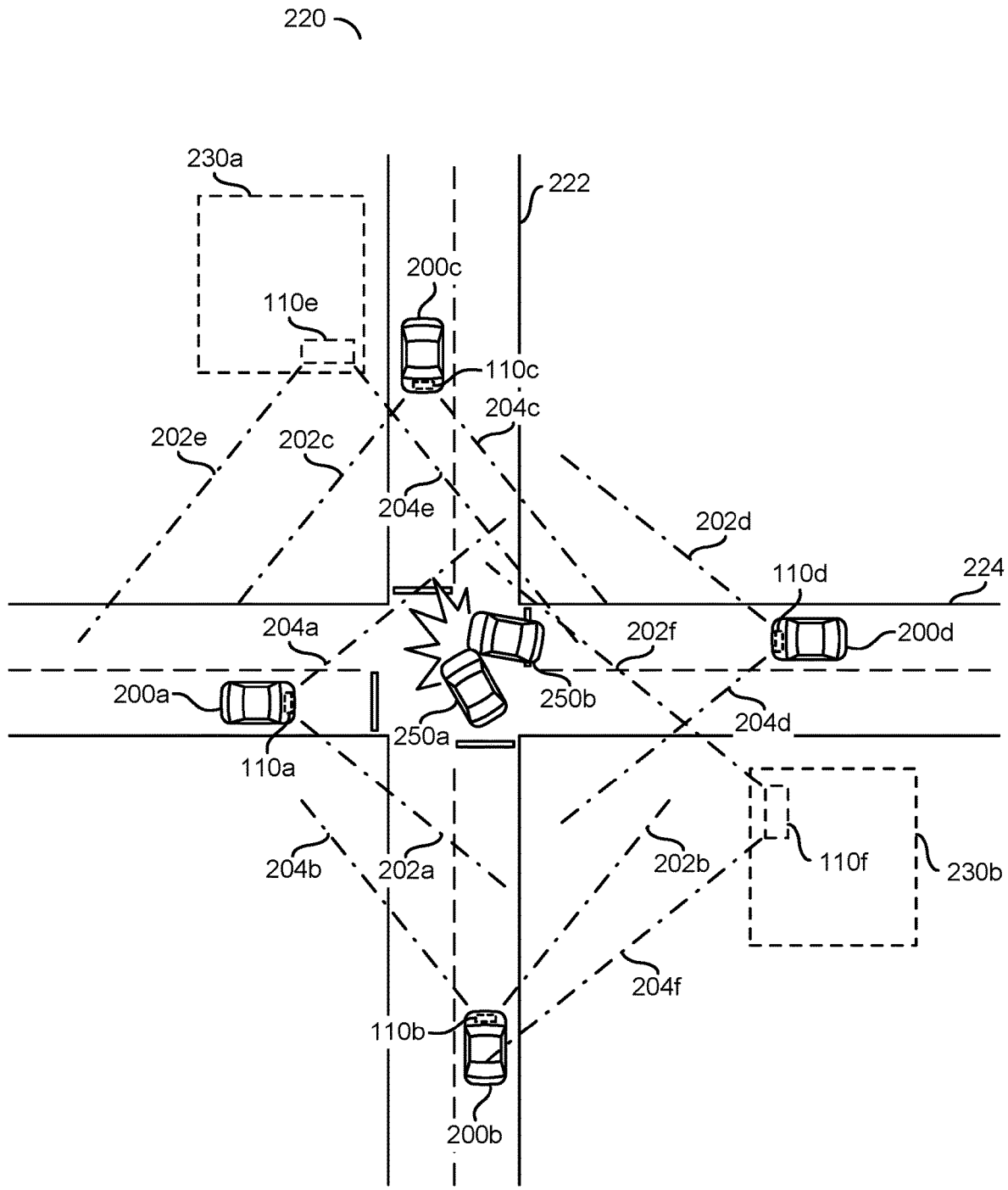
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 110a installed, the vehicle 200b may have the capture device 110b installed, the vehicle 200c may have the capture device 110c installed and/or the vehicle 200d may have the capture device 110d installed. The drivers of the vehicle 200a, the vehicle 200b, the vehicle 200c and/or the vehicle 200d may be data providers. A building 230a and a building 230b are shown. The building 230a may have the capture device 110e installed and the building 230b may have the capture device 110f installed as a security camera. In some embodiments, one or more of the capture devices 110a-110n may be implemented as stationary cameras. The owner of the building 230a and the owner of the building 230b may be data providers for the system 50 (e.g., capture video of the event 220).

The capture device 110a may capture one field of view (e.g., the line 202a and the line 204a) from the viewpoint of the vehicle 200a. The capture device 110b may capture one field of view (e.g., the line 202b and the line 204b) from the viewpoint of the vehicle 200b. The capture device 110c may capture one field of view (e.g., the line 202c and the line 204c) from the viewpoint of the vehicle 200c. The capture device 110d may capture one field of view (e.g., the line 202d and the line 204d) from the viewpoint of the vehicle 200d. The capture device 110e may capture one field of view (e.g., the line 202e and the line 204e) from the viewpoint of the building 230a. The capture device 110f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 110a-110f of the event 220. For example, the database 130 may receive six different user IDs of the data provider users. The database 130 may receive six slightly different GPS co-ordinates corresponding to the different locations of the cameras 110a-110f. In some embodiments, the database 130 may receive the same timestamp from each of the capture device 110a-110f. In some embodiments, the timestamp may be slightly different because the video files may be stored as video clips having a pre-determined time (e.g., 2 minute video clips) and the start and end time of each video clip may depend on when the cameras 110a-110f were booted up (e.g., when the vehicles 200a-200d were started). In some embodiments, system 50 may be configured to synchronize the time on each of the capture devices 110a-110n (e.g., to ensure the timestamp for a start and end time of each video clip matches between the capture devices 110a-110n). The database 130 may receive up to 6 different direction metadata information. In some embodiments, multiple clips 182a-182n with metadata information 184a-184n and/or general metadata 184a'-184n' may be received (e.g., depending on the length of the event 220).

The video metadata from each of the cameras 110a-110f may be uploaded to the database 130. Since two vehicles (e.g., 250a-250b) are in the car accident, the database 130 may associate the video metadata 184a-184n with two license plates entries (e.g., 180a for the vehicle 250a and 180b for the vehicle 250b). Depending on the fields of view, some of the cameras 110a-110n may not capture both license plates (e.g., the field of view of the camera 110b may capture the license plate of the vehicle 250a but not capture the license plate of the vehicle 250b). License plate entries may be made for the data provider vehicles 200a-200d (e.g., the capture device 110a may capture the license plate of the vehicle 200d). Similarly, the general metadata 184a'-184n' entries may be made for the data provider vehicles 200a-200n in addition to license plate information, or when license plate information is not available (e.g., obscured in the view).

The video metadata 184a-184n may be extracted from the video data captured by each of the capture devices 110a-110n. The video metadata 184a-184n may be associated with one of the clips 182a-182n for each of the license plate entries 180a-180n corresponding to a vehicle detected in the field of view. In one example, the license plate entry 180a may correspond to the vehicle 250a and the metadata 184a-184n generated by the capture device 110a may be associated with the clip 182a for the plate entry 180a in the database 130. In another example, the metadata 184a-184n generated by the capture device 110b may be associated with the clip 182b for the plate entry 180a in the database 130. Similarly, the license plate entry 180b may correspond to the vehicle 250b and the metadata 184a-184n generated by the capture device 110a may be associated with the clip 182a for the plate entry 180b in the database 130. In another example, the metadata 184a-184n generated by the capture device 110b may be associated with the clip 182b for the plate entry 180b in the database 130. The subscriber users may use the subscriber devices 100a-100n (e.g., via the app and/or web interface 102a) to search the metadata 184a-184n to view any videos that may have been captured of the event 220.

In some embodiments, the capture devices 110a-110n may implement Wi-Fi communication (e.g., to transmit the metadata and/or the recorded videos to the network 60). Implementing the Bluetooth communication to transfer data between the capture devices 110a-110n and the user devices 112a-112n may be useful in the vehicles (e.g., 200a-200d) to forward metadata and/or recorded videos to the network 60. In some embodiments, the capture devices 110a-110n may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 110a-110n could be placed to face out a window of a home and/or business (e.g., similar to a consumer IP camera). Connecting the capture devices 110a-110n to a Wi-Fi access point may enable the cameras 110a-110n to operate like a consumer IP Camera but additionally provide the video metadata 184a-184n (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 110a-110n in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250a, the driver of the vehicle 250b, an insurance company representing the drivers of the vehicles 250a-250b, and/or another user) searches the video metadata 184a-184n (or the general metadata 184a'-184n') in the database 130, a list of videos of the event 220 may be provided. If the subscriber user decides to request a video recording of the event, the server 120 may send a request to one or more of the capture devices 110a-110n (or the associated user device 112a-112n). The circuits 114a-114n may set a flag for the requested video in response to the request from the server 120. Setting the flag for the requested video may be used to preserve the requested video recording (e.g., prevent the video from being over-written). The capture devices 110a-110n and/or the user devices 112a-112n may upload the video data to the server 120. In some embodiments, the associated video may be preserved for all data points that may be returned as search results of a search query. For example, the server 120 may send the request to one or more of the capture devices 110a-110n (or the associated user device 112a-112n) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 110a-110n that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 110a-110n in the vicinity may start preserving data. In one example, if the VIP event is happening presently, the video data being currently recorded may be preserved. In another example, the video data currently residing in the memory of the capture devices 110a-110n associated with the time of the event may be preserved (e.g., a crime is reported after the event occurs and later an interrupt request is provided to the capture devices 110a-110n to preserve potential evidence).

Figure 5:
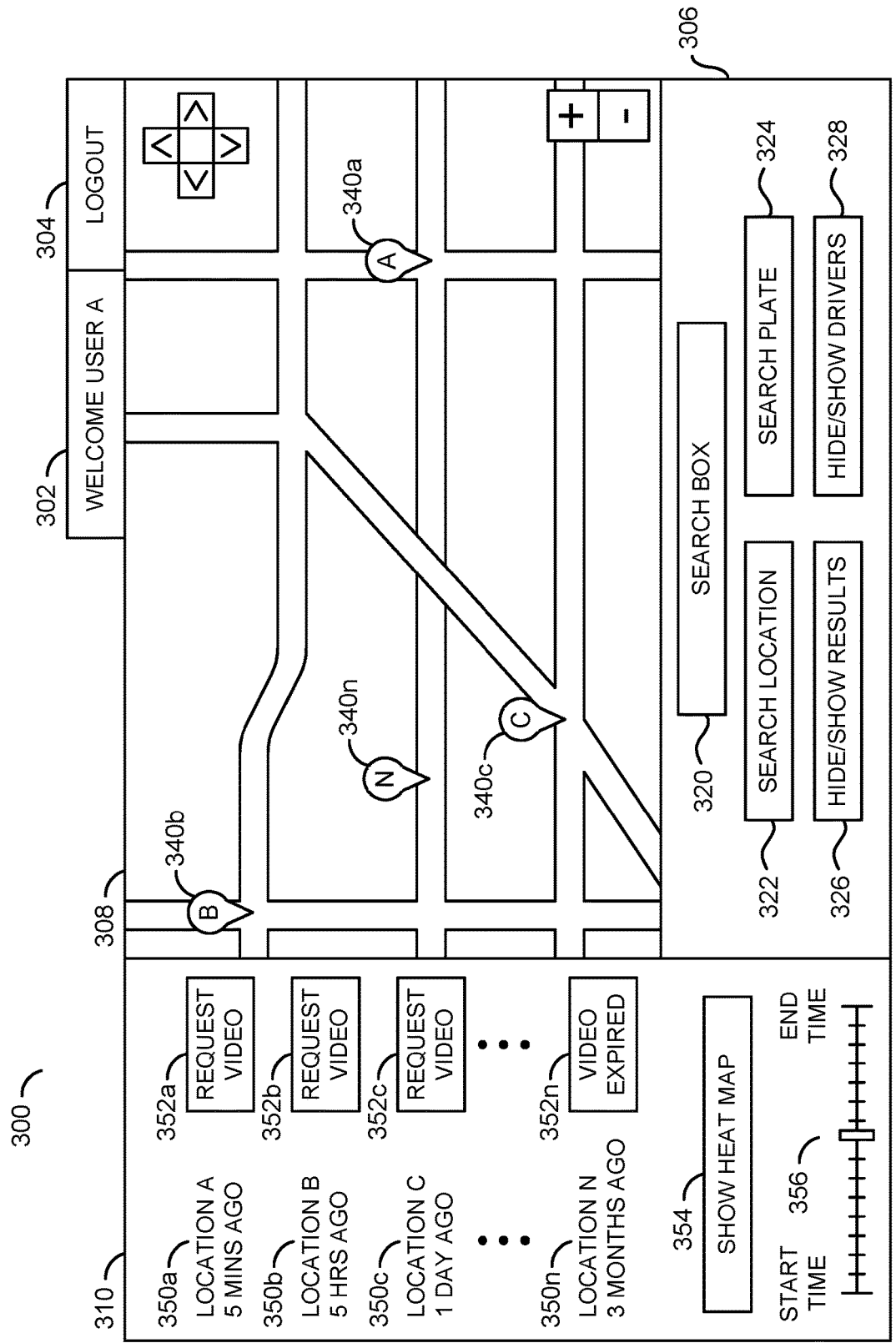
FIG. 5 is a diagram illustrating an example interface.

Referring to FIG. 5, a diagram illustrating an example interface 300 is shown. In an example, the subscriber user may view and/or interact with the interface 300 by accessing the app (or web interface) 102a using one of the subscriber devices 100a-100n. The interface 300 may be implemented by the system 50 to provide user-friendly input and/or access to the database 130. The subscriber user may input search queries to the database 130 using the interface 300.

The interface 300 may comprise a user greeting 302. The user greeting 302 may indicate which user from the subscriber list 150 is logged in. The user greeting 302 may provide a link to an account of the subscriber user (e.g., to edit settings and/or preferences). The interface 300 may comprise a logout 304. The interface 300 may comprise a search request panel 306, a map view 308 and/or a results panel 310. The design, layout and/or content of the interface 300 may be varied according to the design criteria of a particular implementation.

The search request panel 306 may be configured to receive input from the subscriber user. In the example shown, the search request panel 306 may comprise a search box 320, a location search option (or button) 322, a plate search option (or button) 324, a results toggle (or button) 326 and/or a driver toggle (or button) 328. For example, the results toggle 326 may toggle the visibility of the results panel 310 (e.g., hiding the results panel 310 may provide more space for the map view 308). Other input may be presented in the search request panel 306 (e.g., time, date, data provider user ID, etc.). The input available in the search request panel 306 may be varied according to the design criteria of a particular implementation and/or available search parameters for the database 130.

The map view 308 may be configured to provide a visual representation of where search results are located. For example, the map view 308 may provide a graphical representation of the results of the search queries. The map view 308 may generate a map representation (e.g., a street view, a city view, etc.) to indicate where video recordings occurred (based on the video metadata 184a-184n). In one example, the map view 308 may be implemented using an application programming interface (API) provided by a third party (e.g., Google Maps, Bing Maps, Apple Maps, OpenStreetMap, etc.). Pin icons 340a-340n are shown on the map view 308. The pin icons 340a-340n may be visual indicators representing hits generated in response to a search query of the metadata 184a-184n. For example, the pin icons 340a-340n may represent where the vehicles were seen at a particular time (e.g., captured on video). The driver toggle button 328 may be used to select between hiding and showing the pin icons 340a-340n.

The results panel 310 may be configured to provide textual information about results from search queries. Metadata results 350a-350n are shown. The metadata results 350a-350n may be generated in response to the video metadata 184a-184n in the database 130. In one example, the metadata results 350a-350n may be presented in chronological order. Options may be provided for sorting the metadata results 350a-350n (e.g., chronological order, reverse chronological order, nearest location, farthest location, etc.). The metadata results 350a-350n may provide some or all of the video metadata 184a-184n. The metadata results 350a-350n may correspond to the pin icons 340a-

340*n* on the map view 308. For example, the metadata results 350*a* may correspond to the pin icon 340*a*. In the example shown, the metadata results comprise a location and a time. For example, the location may comprise a longitude, latitude and altitude. In another example, the time may be presented as a date and timestamp and/or a difference from the present time (e.g., 1 hour ago).

Each of the metadata results 350*a*-350*n* may have a corresponding video button 352*a*-352*n*. The video buttons 352*a*-352*n* may provide a link to initiate a request to receive the recorded video (e.g., a video request) from the capture devices 110*a*-110*n*. The system 50 may transmit the video request to one or more of the capture devices 110*a*-110*n* to preserve the video and/or upload the recorded video. In the example shown, the video button 352*n* indicates that the video corresponding to the metadata result 350*n* has expired (e.g., no longer stored by one of the cameras 110*a*-110*n*). The video button 352*n* may provide the video metadata 184*a*-184*n* (or the general metadata 184*a*'-184*n*') corresponding to the metadata result 350*n* (e.g., in a format that may be copied and pasted, in a particular file format, in a comma separate value format, etc.). The metadata result 350*n* may still be useful even if the recorded video is no longer available. For example, the metadata results 350*n* may be valuable when the data provider has captured license plates just before and/or just after the time of an accident (e.g., the metadata may be used by police or others that are able to cross reference license plate to an automobile owner). The metadata results 350*a*-350*n*, even without video, may be able to be used by the police to contact witnesses to the event. The metadata results 350*a*-350*n*, with or without video, may be used in accident investigation, asset recovery (e.g., stolen vehicles and/or items), locating persons-of-interest and/or crime investigations.

The results panel 310 may also comprise a heat map toggle (or button) 354 and/or a time range input (or slider) 356. The heat hap toggle 354 may activate/deactivate a heat map view (to be described in more detail in association with FIG. 8). The time range input 356 may be configured to adjust the map view 308. For example, adjusting the time range input 356 may adjust the locations of the pin icons 340*a*-340*n* to correspond with the location of the detected license plate at a particular time. The slider 356 may show time of day, day of week occurrences and/or generate a report based on the metadata results 350*a*-350*n*.

The subscriber user may log onto the web interface 300 (e.g., if the credentials match the subscriber list 150). The interface 300 may be generated and the subscriber user may have various options. One option may be to enter an address (e.g., in the search box 320 and/or using the button 322). Another option may be to enter a license plate as an alpha-numeric string (e.g., in the search box 320 and/or using the button 324). The subscriber user may search using location information, time information, and or license plate information as a query. Some searches may be searches for metadata including a location and time but no license plate information. Some searches may be searches for metadata including license plate information without a location. Some searches may be searches for characteristics of an object (e.g., a color of a vehicle, a make of a vehicle, a model of a vehicle, etc.).

The database 130 may be queried against the metadata 184*a*-184*n* of the plate metadata 158 and/or the general metadata 184*a*'-184*n*' of the other metadata 160. If the database 130 determines that there are hits (e.g., matches) for the location vicinity and/or time frame the map view 308 may be updated with numbered pins 340*a*-340*n* (or other types of identification). The pin icons 340*a*-340*n* may appear on the map view 308 grouped around the location of the search query. The results panel 310 may display metadata results 350*a*-350*n* corresponding to the pin icons 340*a*-340*n*. The video buttons 352*a*-352*n* may correspond to each of the pin icons 340*a*-340*n*.

Since each driver may drive a different amount of time and/or use external memory (e.g., a SD card) having a different capacity, the life of the video file (e.g., time before the file is overwritten) may be different for each driver. When recorded video is removed from the capture devices 110*a*-110*n* (e.g., overwritten by the newest video) the capture device 110*a*-110*n* and/or the user device 112*a*-112*n* may send an update to the database 130 as a notification of the expiration. For example, the video metadata field 184*n* of the corresponding clip 182*a*-182*n* may be updated. In some embodiments, the pin icons 340*a*-340*n* may be color coded based on an expected (or anticipated) amount of time that the video recording may be available. Based on the historical driving patterns of each of the data providers, the server 120 may determine an approximation of how long the video recording will last before being overwritten. For example, the pin icons 340*a*-340*n* may be green colored to indicate that the subscriber user may likely have a day or two to retrieve the recorded video. In another example, the pin icons 340*a*-340*n* may be orange colored to indicate less time (e.g., within a day until expiration). In yet another example, the pin icons 340*a*-340*n* may be red colored to indicate that the video will be overwritten shortly (e.g., within a few hours).

In some embodiments, the interface 300 may enable the subscriber user to interact with the pin icons 340*a*-340*n* (e.g., click, tap, etc.). Interacting with the pin icons 340*a*-340*n* may provide an option to request the video (e.g., similar functionality as the request video buttons 352*a*-352*n*). If the subscriber requests a video, the video request may be sent to the cloud (e.g., the network 60), then to a corresponding one of the user devices 112*a*-112*n* (e.g., the smartphone that may be associated with the capture device 110*a*-110*n* that recorded the video), and subsequently to the corresponding (e.g., target) one of the capture devices 110*a*-110*n* to initiate a transfer of the recorded video. The video may be trickled (since Bluetooth has limited bandwidth) from the capture devices 110*a*-110*n*, to the user devices 112*a*-112*n*, to the cloud 60 and then to the server 120. The subscriber user may then be notified that the recorded video is available to download.

Figure 6:
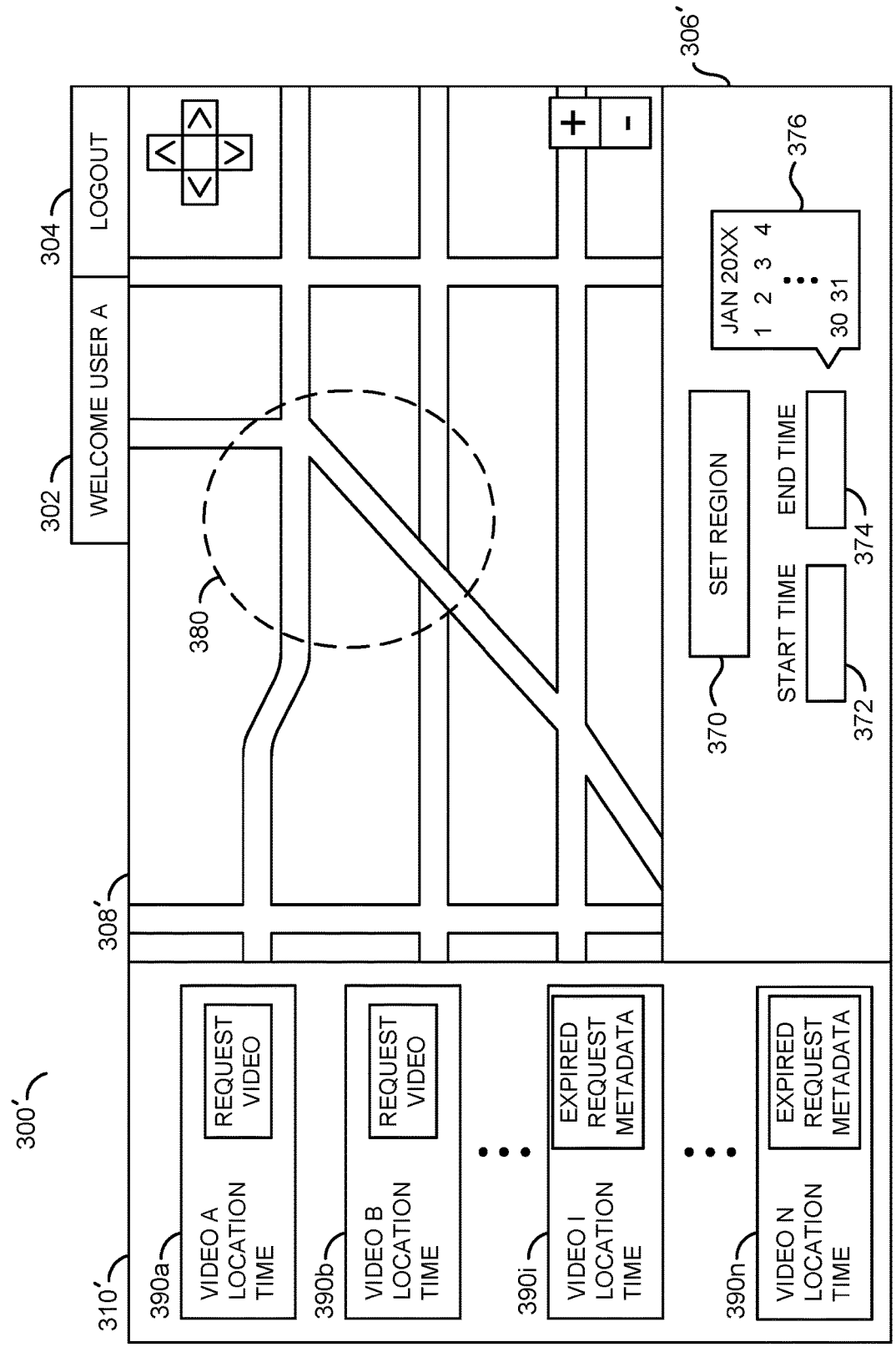
FIG. 6 is a diagram illustrating an example interface implementing a region and date range.

Referring to FIG. 6, a diagram illustrating an example interface 300' implementing a region and date range is shown. The interface 300' may have a similar implementation as described in association with FIG. 5. The interface 300' may comprise the user greeting 302, the logout 304, the search request panel 306', the map view 308' and/or a results panel 310'.

The search request panel 306' may comprise a set region button 370, a start time range input 372, an end time range input 374 and/or a date input 376. The map view 308' may comprise a search region 380. In the example shown, the search region 380 is a region having a circular shape. The shape and/or size of the region 380 may be varied based on the input of the subscriber user. The results panel 310' may comprise search results 390*a*-390*n*. The search results 390*a*-390*n* may comprise the metadata results and/or the video request buttons (as described in association with FIG. 5).

The subscriber user may interact with the map view 308' to provide an input that indicates the region 380. In some embodiments, the subscriber user may drop a pin icon (e.g., click and/or tap on the map) to indicate location. In some embodiments, the subscriber user may manually enter a location (e.g., using text input to define a location and a distance range around the location). In some embodiments, the subscriber user may draw a shape manually (e.g., by dragging a shape tool over the map view 308' to draw a pre-defined and/or freeform shape). For example, the region 380 may be set after the subscriber user releases the mouse button after holding the mouse button to draw the shape (e.g., the set region button 370 may not be implemented). The subscriber user may use the start time input 372, the end time input 374 and/or the date input 376 to specify a time frame (e.g., a range of times).

A query may be sent to the database 130 to search the radius around the location region 380 along with the time range defined by the input 372, the input 374 and/or the input 376. The database 130 may return results for videos that may exist (or video recordings that did exist but are now deleted). The results panel 310' may provide details of the search results and the subscriber user may push another button to request the video (if the video exists).

If the video no longer exists, the subscriber user may still be able to see the metadata results from the now expired video. For example, the search results 390a-390n may present the subscriber user with a list of license plates of vehicles that may have a high probability of witnessing a particular event (e.g., that were present a pre-determined amount of time before, during and/or a pre-determined amount of time after the event occurred, that had a field of view facing the event, etc.). In some embodiments, the event may be defined as the address and/or time that the subscriber user has entered for the search query. In some embodiments, the data providers may submit contact information (e.g., an email address, a phone number, a private messaging system may be implemented, etc.) to enable the subscriber users to request an eyewitness to an event (e.g., when the video recording is no longer available).

Figure 7:
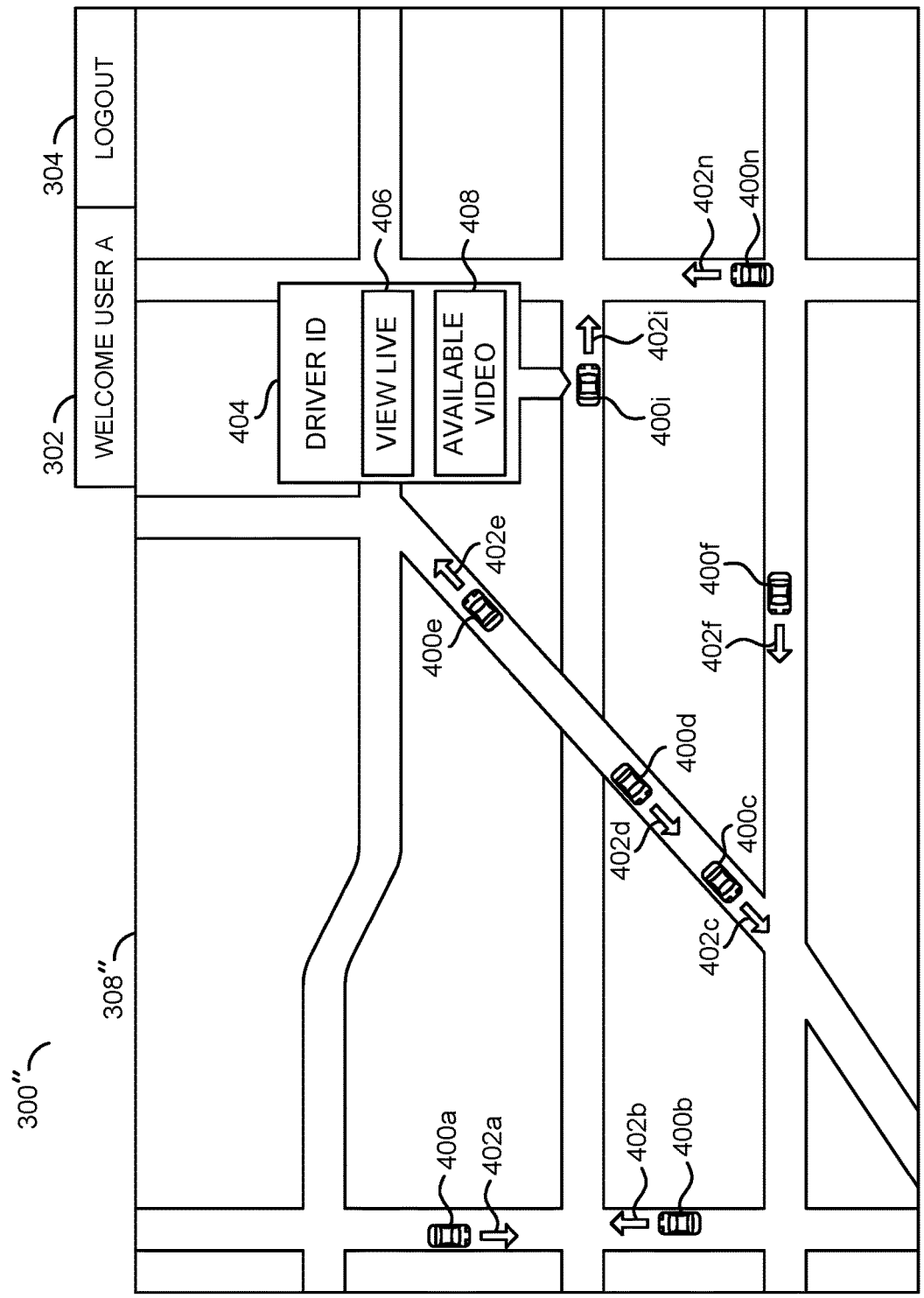
FIG. 7 is a diagram illustrating an example interface implementing a real-time and/or historical view of vehicles that are capturing video and/or vehicles previously captured on video.

Referring to FIG. 7, a diagram illustrating an example interface 300" implementing a real-time and/or historical view of vehicles that are capturing video and/or vehicles previously captured on video is shown. The interface 300" may have a similar implementation as described in association with FIG. 5. The interface 300" may comprise the user greeting 302, the logout 304 and/or the live view 308". In some embodiments, the interface 300" may be adjusted based on the settings and/or preferences of the subscriber user using the app (or web interface) 102a. In the example shown, the live view 308" may be expanded and other portions of the interface 300" (e.g., the search panel 306 and/or the results panel 310) may be hidden.

The map view may comprise the vehicle icons 400a-400n. The vehicle icons 400a-400n may be visual indicators representing a last known position (or current position) of the data providers (or a subset of data providers in a particular locality). For example, the vehicle icons 400a-400n may be generated by the app 102a and/or the subscriber devices 100a-100n in response to data from the server 120 (e.g., stored GPS information provided by the capture devices 110a-110n). Arrows 402a-402n are shown. Each of the arrows 402a-402n may correspond to one of the vehicles 400a-400n. In some embodiments, the arrows 402a-402n may indicate a direction of travel of the vehicles 400a-400n. In some embodiments, the arrows 402a-402n may indicate a direction that video is being captured by one of the capture devices 110a-110n. If a vehicle has more than one of the capture devices 110a-110n installed, multiple arrows 402a-402n may be associated with one of the vehicles 400a-400n). For example, the arrows 402a-402n may indicate a direction of the field of view of the video presently being captured by displaying a cone shaped field of view on the live view interface 308" (e.g., emulating the field of view of the video being captured by the capture devices 110a-110n).

The live view 308" may generate a live view of vehicles that may be represented by the vehicle icons 400a-400n. In some embodiments, the live view may be a real time view (or near real time). In some embodiments, the live view 308" may be a frequently updated view (e.g., static views that are updated to appear as close to real time). For example, the vehicle icons 400a-400n and/or the arrows (or field of view cones) 402a-402n may move along the map (e.g., without manually refreshing the interface). The vehicle icons 400a-400n and/or the arrows (or field of view cones) 402a-402n may move along the live view 308" to correspond with a real-world location of a vehicle. In some embodiments, the live view 308" may generate a view of locations of all drivers (e.g., data providers) at a selected time (e.g., the time range input 356 may be used to provide a date/time entry to show a snapshot of where each driver was located and/or a direction of the field of view of the corresponding capture devices 110a-110n).

In some embodiments, the vehicle icons 400a-400n may represent vehicles of data providers (e.g., based on the location of the capture devices 110a-110n). In some embodiments, the vehicle icons 400a-400n may represent a location of any vehicle based on a captured license plate. For example, one of the capture devices 110a-110n may capture a vehicle license plate, the metadata corresponding to the vehicle (e.g., the license plate, the time, the location) may be uploaded to the server 120, and the server 120 may provide the location of the vehicle based on the metadata to the app 102a to display on the live map view 308".

The subscriber user may interact with the vehicle icons 400a-400n (e.g., click, tap, long press, etc.) to receive additional information. In the example shown, a pop up box 404 is shown associated with the vehicle icon 400i. The pop up box 404 may be a graphical overlay displayed on the live view 308". The pop up box 404 may comprise a driver ID (e.g., a data provider ID, a license plate detected, etc.). The pop up box 404 may comprise a live view button 406 and/or an available video button 408.

In some embodiments, the capture devices 110a-110n may implement Wi-Fi communication. With a Wi-Fi data transfer function (or other high throughput wireless communication), the capture devices 110a-110n may be configured to stream video. The subscriber user may click on the live view button 406 and turn on a live (or near live) stream of the video recorded by the corresponding one of the capture devices 110a-110n. The app 102a may enable the subscriber user to connect to the corresponding one of the cameras 110a-110n and initiate streaming from the camera. In one example, the stream may be a live video feed having a lower resolution, lower bitrate and/or lower frame rate than video stored by the capture devices 110a-110n. In another example, the stream may be a live video feed having similar characteristics as the video stored by the capture devices 110a-110n. For example, the server 120 may set up a point-to-point connection from the data provider user to the subscriber user.

In some embodiments, the subscriber user may use the video request button 408 to view a list of available videos captured by the data provider user (e.g., based on an 'id' field of the metadata 184a-184n). In some embodiments, the subscriber user may use the video request button 408 to initiate an upload of the video over Bluetooth/Wi-Fi to the user device (e.g., one of the smartphones 112a-112n) when requested. The user device (e.g., one of the smartphones 112a-112n) may use 3G/4G/LTE/5G to upload the video to the server 120 for the subscriber user to download (e.g., a file transfer). In another example, the capture devices 110a-110n may be configured to log onto a Wi-Fi network using pre-determined credentials (e.g., pre-programmed, set up in advanced by the driver, etc.) to directly upload the video data to the network 60. For example, the capture devices 110a-110n may be configured to implement a web server capable of parsing an HTML page that requests input (e.g., credentials, a user agreement, a password, etc.) to prompt a driver to input data. In another example, the capture devices 110a-110n may be configured to negotiate seamlessly (e.g., using pre-programmed credentials) with a Wi-Fi access point to upload the video data without distracting the driver.

Since the server 120 may receive updated GPS information of each driver every few seconds, the live view 308" may show the vehicle icons 400a-400n moving around in real time. Using the button 406, the subscriber user may have virtual eyes on the road by viewing a live stream of the recorded video (e.g., initiate real time streaming directly from the dashboard camera of the data provider user). Using the button 408, the subscriber user may see recent video from a location that the driver just passed (e.g., non-real time).

Figure 8:
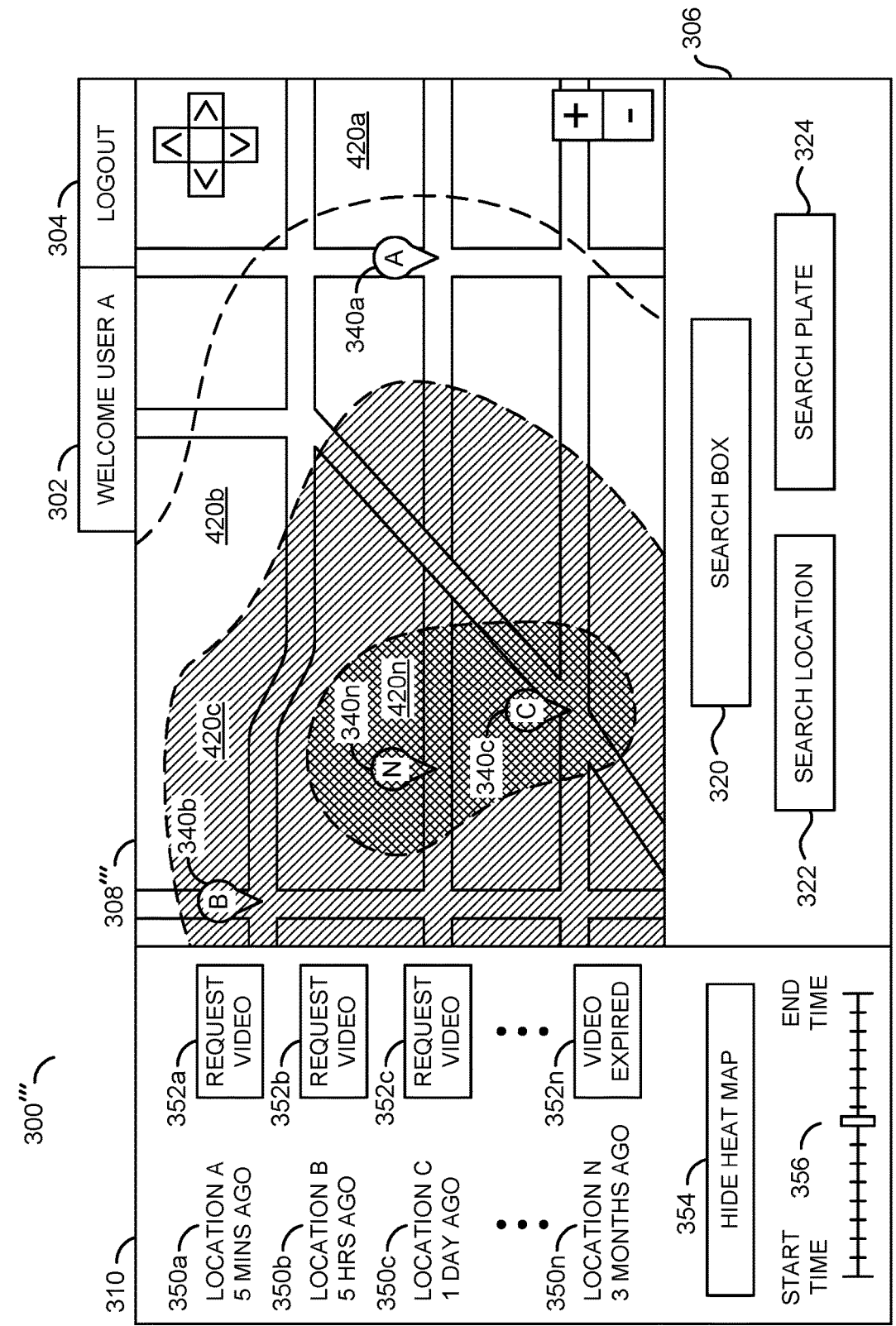
FIG. 8 is a diagram illustrating an example interface implementing a heat map.

Referring to FIG. 8, a diagram illustrating an example interface 300''' implementing a heat map is shown. The interface 300''' may have a similar implementation as described in association with FIG. 5. The interface 300''' may comprise the user greeting 302, the logout 304, the search panel 306, the heat map view 308''' and/or the results panel 310. For example, the interface 300''' may be toggled on or off when the subscriber user clicks the heat map button 354 (e.g., toggled between the map view 308 and the heat map view 308''').

The heat map view 308''' may comprise one or more regions 420a-420n. The regions 420a-420n may represent a comparative view of how often the data providers are in a particular location. For example, vehicles that follow a regular routine (e.g., driving the same path to work every morning) may result in particular locations being traveled more often. In the example shown, the region 420n may represent a highly traveled region and the region 420a may be a region that is traveled less often. The heat map view 308''' may use the regions 420a-420n to provide a better visualization of the search results to the subscriber user. In one example, the time range input 356 may move through the data points (e.g., the icons 340a-340n and/or the areas 420a-420n) to provide the subscriber user a visualization of where various vehicles were at a particular time. For example, the time range input 356 may be segmented to provide days of the week to show data points from Saturday to Sunday. For example, the time range input 356 may be implemented with a 'play' option to automatically step through time increments (e.g., minutes, hours, days of the week, etc.) to show a moving/updating visualization to the subscriber user. In another example, the time range input 356 may be a scroll bar that the subscriber user may drag to generate a visualization of where a particular vehicle is and/or where vehicles have been (e.g., during weekdays, week nights, weekends, etc.). The server 120 may also be configured to prepare a report that gives the subscriber user a sense of where a particular car was at any particular day of the week and/or time of the day.

In some embodiments, the server 120 may be configured to predict a future location of a particular driver and/or vehicle. For example, the stored data may be interpolated to determine where a driver may be on a future day. Future and/or predicted data may be used to intercept a vehicle at a future time (e.g., for law enforcement). For example, the previously stored data points (e.g., the metadata 184a-184n for one of the license plate entries 180a-180n) may indicate that a vehicle is at a particular location (e.g., a home of the driver) 80% of the time on federal holidays. The server 120 may determine a probability that the vehicle will be at the same location during an upcoming holiday. In some embodiments, additional credentials (e.g., stored in the authentication module 154) may be needed to access future vehicle location (e.g., law enforcement credentials, a warrant, etc.).

Figure 9:
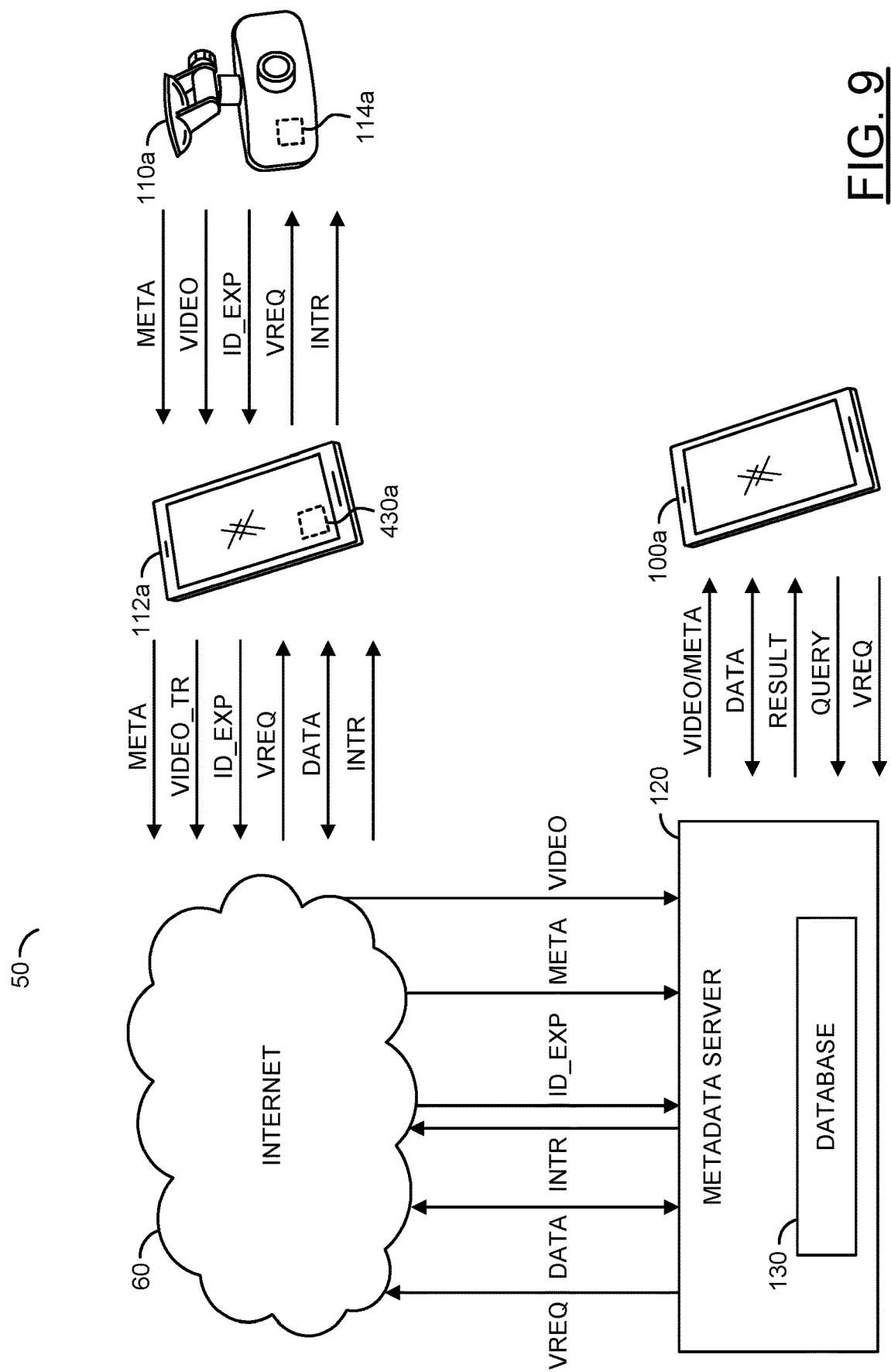
FIG. 9 is a diagram illustrating communication between a database and a capture device via a wireless communication device.

Referring to FIG. 9, a diagram illustrating communication between the database 130 and the capture device 110a via the wireless communication device 112a is shown. In the example shown, a portion of the system 50 comprising the capture device 110a, the user device 112a, the network 60, the server 120 and the subscriber device 100a are illustrated as a representative example. For example, the system 50 generally comprises multiple subscriber devices 100a-100n, capture devices 110a-110n and/or user devices 112a-112n. A number of signals are shown being communicated between the components of the system 50. The number and/or types of data transmitted in each of the signals may be varied according to the design criteria of a particular implementation.

The capture device 110a is shown presenting a signal (e.g., META), a signal (e.g., VIDEO) and/or a signal (e.g., ID_EXP). The capture device 110a is shown receiving a signal (e.g., VREQ) and/or a signal (e.g., INTR). The capture device 110a may present the signal META, the signal VIDEO and/or the signal ID_EXP to the user device 112a (e.g., a wireless communication device). The capture device 110a may receive the signal VREQ and/or the signal INTR from the user device 112a.

The user device 112a is shown receiving the signal META, the signal VIDEO, the signal ID_EXP, the signal VREQ, a signal (e.g., DATA) and/or the signal INTR. The user device 112a is shown presenting the signal META, a signal (e.g., VIDEO_TR), the signal ID_EXP, the signal DATA, the signal VREQ and/or the signal INTR. The user device 112a may present the signal META, the signal VIDEO_TR, the signal ID_EXP and/or the signal DATA to the network 60. The user device 112a may receive the signal VREQ, the signal DATA and/or the signal INTR from the network 60. The user device 112a may present the signal VREQ and/or the signal INTR to the capture device 110a. The user device 112a may receive the signal META, the signal VIDEO and/or the signal ID_EXP from the capture device 110a.

The network 60 is shown receiving the signal META, the signal VIDEO_TR, the signal ID_EXP, the signal DATA, the signal INTR and/or the signal VREQ. The network 60 is shown presenting the signal VREQ, the signal INTR, the signal DATA, the signal VIDEO, the signal META and/or the signal ID_EXP. The network 60 may present the signal VREQ, the signal DATA and/or the signal INTR to the user device 112a. The network 60 may receive the signal META, the signal VIDEO_TR, the signal ID_EXP and/or the signal DATA from the user device 112a. The network 60 may present the signal DATA, the signal ID_EXP, the signal META and/or the signal VIDEO to the server 120. The network 60 may receive the signal VREQ, the signal DATA and/or the signal INTR from the server 120.

The server 120 is shown receiving the signal DATA, the signal ID_EXP, the signal META, the signal VIDEO, the signal VREQ and/or a signal (e.g., QUERY). The server 120 is shown presenting the signal VREQ, the signal DATA, the signal INTR, a signal (e.g., VIDEO/META) and/or a signal (e.g., RESULT). The server 120 may receive the signal DATA, the signal ID_EXP, the signal META and/or the signal VIDEO from the network 60. The server 120 may present the signal VREQ, the signal DATA and/or the signal INTR to the network 60. The server 120 may receive the signal DATA, the signal VREQ and/or the signal QUERY from the subscriber device 100*a*. The server 120 may present the signal VIDEO/META, the signal DATA and/or the signal RESULT to the subscriber device 100*a*.

The subscriber device 100*a* is shown receiving the signal VIDEO/META, the signal DATA and/or the signal RESULT. The subscriber device 100*a* is shown presenting the signal DATA, the signal VREQ and/or the signal QUERY to the server 120. The subscriber device 100*a* may receive the signal VIDEO/META, the signal DATA and/or the signal RESULT from the server 120. The subscriber device 100*a* may present the signal DATA, the signal VREQ and/or the signal QUERY to the server 120.

The signal META may comprise the metadata 184*a*-184*n* and/or the general metadata 184*a*'-184*n*' extracted from the captured video by the capture device 110*a* and/or the circuit 114*a*. The signal META may be generated by the capture device 110*a* and transmitted to the database 130 for storage and/or indexing. The capture device 110*a* may implement a short-range, inexpensive and/or low power consumption communications protocol (e.g., Bluetooth) to communicate with the user device 112*a*. The user device 112*a* may forward the signal META to the network 60. The network 60 may transmit the signal META to the server 120 for storage in the database 130.

The signal VIDEO and/or the signal VIDEO_TR may comprise the video data recorded by the capture device 110*a* and/or the circuit 114*a*. The signal VIDEO may be generated by the capture device 110*a* and transmitted to the server 120 and/or the subscriber device 100*a*. The capture device 110*a* may implement a short-range, inexpensive and/or low power consumption communications protocol (e.g., Bluetooth) to communicate with the user device 112*a*. The user device 112*a* may forward the recorded video as the signal VIDEO_TR to the network 60.

The signal VIDEO_TR may be a low-priority version of the signal VIDEO. In some embodiments, the signal VIDEO_TR may be one portion of the signal VIDEO (e.g., different portions of the recorded video data may be transmitted at different times). For example, the signal VIDEO_TR may transmit portions of the video data sequentially and/or in a random order. For example, the signal VIDEO may be buffered by the user device 112*a* (e.g., for temporary storage). The user device 112*a* is shown comprising a block (or circuit) 430*a*. The circuit 430*a* may comprise a memory buffer and/or a cache. The user device 112*a* may store the signal VIDEO in the buffer 430*a* and determine an appropriate time to transmit the recorded video to the network 60 (e.g., delay transmission based on a connection type and/or a bandwidth restriction).

The user device 112*a* may wait until bandwidth and/or data usage restrictions are not in place. In one example, cellular data plans (e.g., 3G/4G/LTE/5G) implement data usage caps (e.g., a 1 GB monthly limit) with expensive overage fees and/or implement transfer rate throttling (e.g., reducing data throughput transfer rates). The user device 112*a* may be configured to avoid transmitting the signal VIDEO when the data cap would be consumed (or onerous fees would be incurred). For example, the user device 112*a* may wait until a Wi-Fi hotspot is available to transmit the signal VIDEO_TR.

The user device 112*a* may consume more power while transferring the signal VIDEO_TR. In an example, the user device 112*a* may postpone transmitting the signal VIDEO_TR based on power availability (e.g., based on a user setting and/or if the battery of the user device 112*a* is below a pre-determined threshold). In another example, the signal VIDEO_TR may be transferred at a lower transfer rate and/or as a low priority data transfer (e.g., other data unrelated to the system 50 may be transmitted as a higher priority). The implementation of the transfer of the signal VIDEO_TR may be varied according to the design criteria of a particular implementation.

The network 60 may transmit the signal VIDEO to the server 120 for storage. The server 120 may transmit the signal VIDEO (e.g., as part of the signal VIDEO/META) to the subscriber device 100*a*. Generally, the transfer of the signal VIDEO may not be initiated by the capture device 110*a* until the subscriber user requests the video. For example, if a user does not request a recorded video, the video file may eventually be overwritten by the capture device 110*a*. Since the recorded video is not transmitted until requested, unnecessary transfer and/or storage of data may be reduced.

The signal ID_EXP may comprise a notification (e.g., a flag) indicating that one of the recorded videos stored by the capture device 110*a* has expired (e.g., has been overwritten). The capture device 110*a* may implement loop recording and, over time, may overwrite stored video (e.g., the oldest video data). The signal ID_EXP may be configured to notify the server 120 and/or the database 130 that the video is no longer available. The signal ID_EXP may be generated by the capture device 110*a* and transmitted to the database 130 for storage and/or indexing. The capture device 110*a* may implement a short-range, inexpensive and/or low power consumption communications protocol (e.g., Bluetooth) to communicate with the user device 112*a*. The user device 112*a* may forward the signal ID_EXP to the network 60. The network 60 may transmit the signal ID_EXP to the server 120 for storage in the database 130. For example, information transmitted by the signal ID_EXP may be stored as the expiration status flag metadata 184*n* in the clips 182*a*-182*n*. When the signal ID_EXP is received and when the corresponding video is requested, the server 120 may provide metadata only instead of video in response to the request from the subscriber user.

The signal VREQ may comprise a request to the capture device 110*a* configured to initiate an upload of one of the recorded videos stored by the capture device 110*a* and/or the circuit 114*a*. For example, the transfer of the signal VIDEO may be initiated in response to the capture device 110*a* receiving the signal VREQ. The signal VREQ may be generated by the subscriber device 100*a*. The signal VREQ may be generated in response to the subscriber user requesting a particular recorded video data clip. For example, the subscriber user may perform a search of the database 130 and receive a list of results based on the stored metadata. If the subscriber user does not request a video file (e.g., no signal VREQ received), the capture devices 110*a* may not upload video data. If the subscriber user does request one of the stored video files, the subscriber device 100*a* may generate the signal VREQ. The server 120 may determine which of the capture devices 110*a*-110*n* has the requested video file (e.g., based on the video list 172*a* and/or the device ID of the clip stored as part of the metadata 184a-184n). The server 120 may transmit the signal VREQ to the network 60, to the corresponding user device 112a and then to the corresponding capture device 110a. In response to the signal VREQ, the server 120 may make the requested video file available to the subscriber user.

The signal INTR may comprise an interrupt request for the capture device 110a. The interrupt request communicated by the signal INTR may be configured to provide various instructions to the capture device 110a. In one example, the interrupt request may be used to initiate a live streaming mode for the capture device 110a. In a live streaming mode, the signal VIDEO may be streamed as a high priority data transfer (e.g., the capture device 110a may communicate with the server 120 without using the user device 112a). In another example, the interrupt request may be used to initiate video storage mode (e.g., record video as a loop recording). In yet another example, the signal INTR may be transmitted to indicate that a particular one of the stored video recordings should be preserved (e.g., when the video recording is an output result of a search request by one of the subscriber users). In still another example, the signal INTR may be transmitted to stop the capture device 110a from recording. Generally, the signal INTR is implemented to provide the capture device 110a with a particular instruction to execute at a particular time (e.g., to cause the capture device 110a to change behavior on demand). The type of instructions transmitted as interrupt requests by the signal INTR may be varied according to the design criteria of a particular implementation.

The signal DATA may comprise miscellaneous data and/or instructions. The signal DATA may be used by the user device 112a and/or the subscriber device 100a. The signal DATA may be communicated between the server 120 and the user device 112a and/or the subscriber device 100a. In one example, the signal DATA may be generated by the server 120 to provide updates to the app 102a stored on the user device 112a and/or the subscriber device 100a. In another example, the signal DATA may be generated by the user device 112a and/or the subscriber device 110a to provide usage statistics and/or metrics to the server 120 (e.g., anonymous usage data to be used as feedback to improve the app 102a and/or the system 50). In some embodiments, the signal DATA may be transmitted to the capture device 110a to provide software and/or firmware updates.

The signal QUERY may comprise search parameters for the database 130. The subscriber user may submit a search request on the subscriber device 100a and the subscriber device 100a may generate the signal QUERY. The search parameters in the signal QUERY may be used by the database 130 to find search results that may be potential matches. The search parameters of the signal QUERY may be compared to the metadata 184a-184n and/or the general metadata 184a'-184n'. The signal RESULT and/or the signal INTR may be generated by the server 120 in response to the signal QUERY. For example, the signal INTR may be generated to preserve the video files corresponding to the search results in case the subscriber user decides to later request a download of the video data.

The signal RESULT may comprise the search results generated by the database 130 in response to the signal QUERY. For example, the signal RESULT may be used by the subscriber device 100a to generate the search results 390a-390n for display on the interface 300. The signal RESULT may be generated based on comparisons between the signal QUERY and the metadata 184a-184n and/or the general metadata 184a'-184n' that result in matches. The signal RESULT may comprise the metadata 184a-184n and/or the general metadata 184a'-184n' corresponding to the clips 182a-182n. In some embodiments, the signal RESULT and the signal INTR may be generated in response to the signal QUERY (e.g., to preserve the stored video data in the event that the subscriber user later decides to request one of the videos corresponding to the data in the signal RESULT). In some embodiments, the database 130 may reject a search query (e.g., a search that is too broad) and the signal RESULT may communicate an error message. The number of search results communicated by the signal RESULT may be varied based on the search query and/or the design criteria of a particular implementation.

The signal VIDEO/META may comprise at least one of the requested video file and/or metadata corresponding to the requested video file. For example, after the signal RESULT is received by the subscriber device 100a, the subscriber user may request to download one or more of the recorded video data clips stored by the capture device 100a (e.g., generate the signal VREQ). If the video is available, the signal VREQ may be transmitted to the corresponding capture device 110a to initiate the upload of the video data (e.g., generate the signal VIDEO). If the video is unavailable, the metadata 184a-184n may be transmitted in the signal VIDEO/META by the server 120 in response to the signal VREQ.

The capture device 110a (e.g., a dash-mounted camera) may be configured to use the user device (e.g., a smartphone) as a tether (or proxy) to connect the capture device 110a to the cloud 60. For example, designing the capture device 110a without 3G/4G/LTE/5G built in may reduce cost, both in terms of hardware and subscription costs to a carrier (e.g., ATT, Sprint, Verizon, T-Mobile, etc.). Since the wireless communication device 112a may implement the 3G/4G/LTE/5G hardware, similar hardware on the capture device 110a may be expensive and/or redundant. Relatively less expensive Bluetooth and/or Wi-Fi hardware may be built into the capture device 110a to communicate with the user device 112a. The carrier subscription and/or the 3G/4G/LTE/5G hardware of the user device 112a may be utilized by the capture device 110a to get data up to and/or from the cloud 60. The system 50 may transfer the data on a datapath from the capture device 110a, to the user device 112a (e.g., via Bluetooth), to the internet 60 (e.g., via 3G/4G/LTE/5G). In some embodiments, the capture device 110a may implement a Wi-Fi connection to the user device 112a. For example, Bluetooth may be a more elegant mechanism to connect to the capture device 110a for a user using the user device 112a. However, Bluetooth may be more bandwidth limited than Wi-Fi.

The video data may be uploaded as a low priority (e.g., trickled) to the buffer 430a in the user device 112a. The app 102a on the user device 112a may wait for the user device 112a to be in a Wi-Fi zone before uploading over Wi-Fi. Buffering the video data may prevent using the 3G/4G/LTE/5G bandwidth and consuming a carrier data usage quota. In another example, if the carrier plan provides for unlimited data with no consequences (e.g., no overage fees, no data throttling, etc.) then the user device 112a may use 3G/4G/LTE/5G for upload to provide the video to the subscriber faster. The user profiles 170a-170n may include details about the data plan of the data provider to better handle how much data is used by the app 102a and/or when data is transmitted to the server 120. If the data provider has a limited data plan more care may be taken to upload video and/or data heavy files when the user is in a Wi-Fi zone rather than a 3G/4G/LTE/5G zone (e.g., where a data usage quota would be impacted).

In some embodiments, the system 50 may implement a mesh network. For example, video data transferred in the signal VIDEO may be uploaded from the capture device 110a and buffered in the buffer 430a of the user device 112a. The user device 112a may be configured to search for another data provider of the system 50 in close proximity. The signal VIDEO and/or the signal VIDEO_TR (e.g., pieces of the video file) may be uploaded by the other users that have available data bandwidth. For example, a data provider with bandwidth restrictions (e.g., a data usage quota) may search for another data provider that may not have bandwidth restrictions and use the unrestricted data provider as a proxy to upload the video data. The user device 110a may reserve storage space for the app 102a and/or the buffered video data in the buffer 430a. Since the video is not consumed by the data provider and the video may not be streamed live, the video data may be transferred in smaller pieces and once each piece has been uploaded to the cloud 60, the uploaded piece(s) may be deleted from the buffer 430a.

Figure 10:
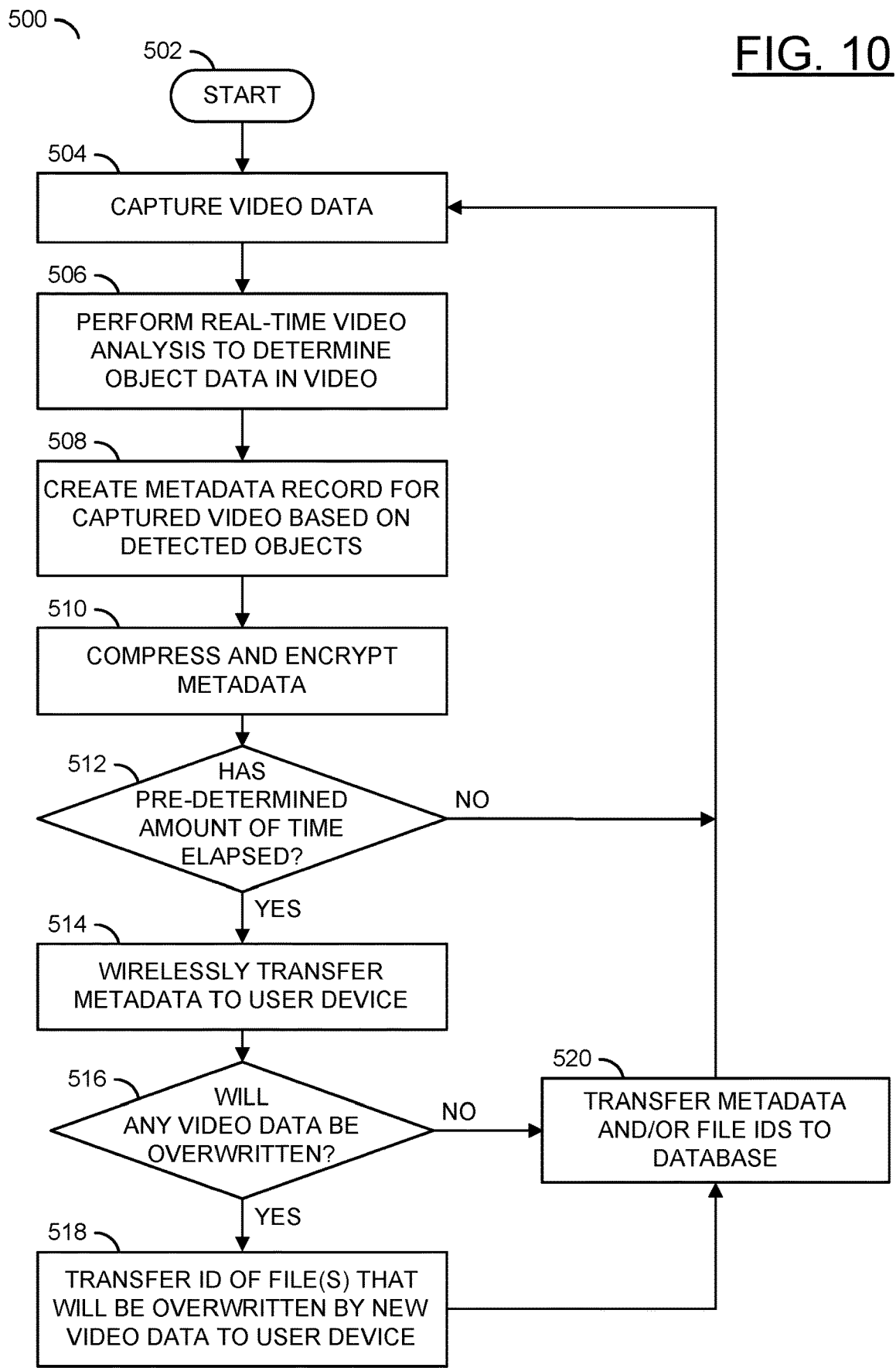
FIG. 10 is a flow diagram illustrating a method for extracting metadata and transmitting metadata to a database.

Referring to FIG. 10, a method (or process) 500 is shown. The method 500 may extract metadata and transmit metadata to the database 130. The method 500 generally comprises a step (or state) 502, a step (or state) 504, a step (or state) 506, a step (or state) 508, a step (or state) 510, a decision step (or state) 512, a step (or state) 514, a decision step (or state) 516, a step (or state) 518, and a step (or state) 520.

The state 502 may start the method 500. In the state 504, the capture devices 110a-110n may capture video data (e.g., from a mobile perspective of a vehicle, from a stationary location, etc.). Next, in the state 506, the circuits 114a-114n may perform real-time video analysis to determine object data in the recorded video. For example, the circuits 114a-114n may be configured to classify and/or recognize various objects (e.g., vehicles, pedestrians, license plates, etc.). The video analysis may comprise optical character recognition and/or comparing features detected in the video data with known features (e.g., templates and/or feature maps) of various objects.

Next, in the state 508, the circuits 114a-114n may create a metadata record for the captured video based on the detected objects. For example, location coordinates, a timestamp, a file ID, direction of travel, direction of a field of view of the capture devices 110a-110n and/or EXIF data may be associated with the video file. In the state 510, the circuits 114a-114n may be configured to compress and/or encrypt the metadata records. Compressing may improve data transmission and/or data storage efficiency. Encrypting may ensure private information is unreadable to third parties. Next, the method 500 may move to the decision state 512.

In the decision state 512, the capture devices 110a-110n may determine whether a pre-determined amount of time has elapsed. The pre-determined amount of time may be part of a communication protocol for transmitting the data. The pre-determined amount of time (e.g., 5 minutes, 10 minutes, 15 minutes, etc.) may reduce a number of transfer requests between devices and/or reduce power consumption. If the pre-determined amount of time has not elapsed, the method 500 may return to the state 504. If the pre-determined amount of time has elapsed, the method 500 may move to the state 514. In the state 514, the capture devices 110a-110n may wirelessly transfer (e.g., via Bluetooth, via Wi-Fi, etc.) the metadata (e.g., the signal META) to the corresponding user devices 112a-112n. Next, the method 500 may move to the decision state 516.

In the decision state 516, the capture devices 110a-110n may determine whether any video data may be overwritten. For example, when a storage medium is full, the capture devices 110a-110n may overwrite the oldest data (e.g., oldest data that is not flagged to be preserved) as a loop recording. If video data may be overwritten, the method 500 may move to the state 518. In the state 518, the capture devices 110a-110n may transfer file IDs of video files that may be overwritten by new video data to the corresponding user devices 112a-112n (e.g., transfer the signal ID_EXP). Next, the method 500 may move to the state 520. In the decision state 516, if the video data may not be overwritten, the method 500 may move to the state 520. In the state 520, the user devices 112a-112n may transfer the metadata and/or the file IDs (e.g., the signal META and/or the signal ID_EXP) to the database 130. For example, the signals META and/or the signal ID_EXP may be transmitted to the database 130 via the network 60 to the server 120. Next, the method 500 may return to the state 504.

Figure 11:
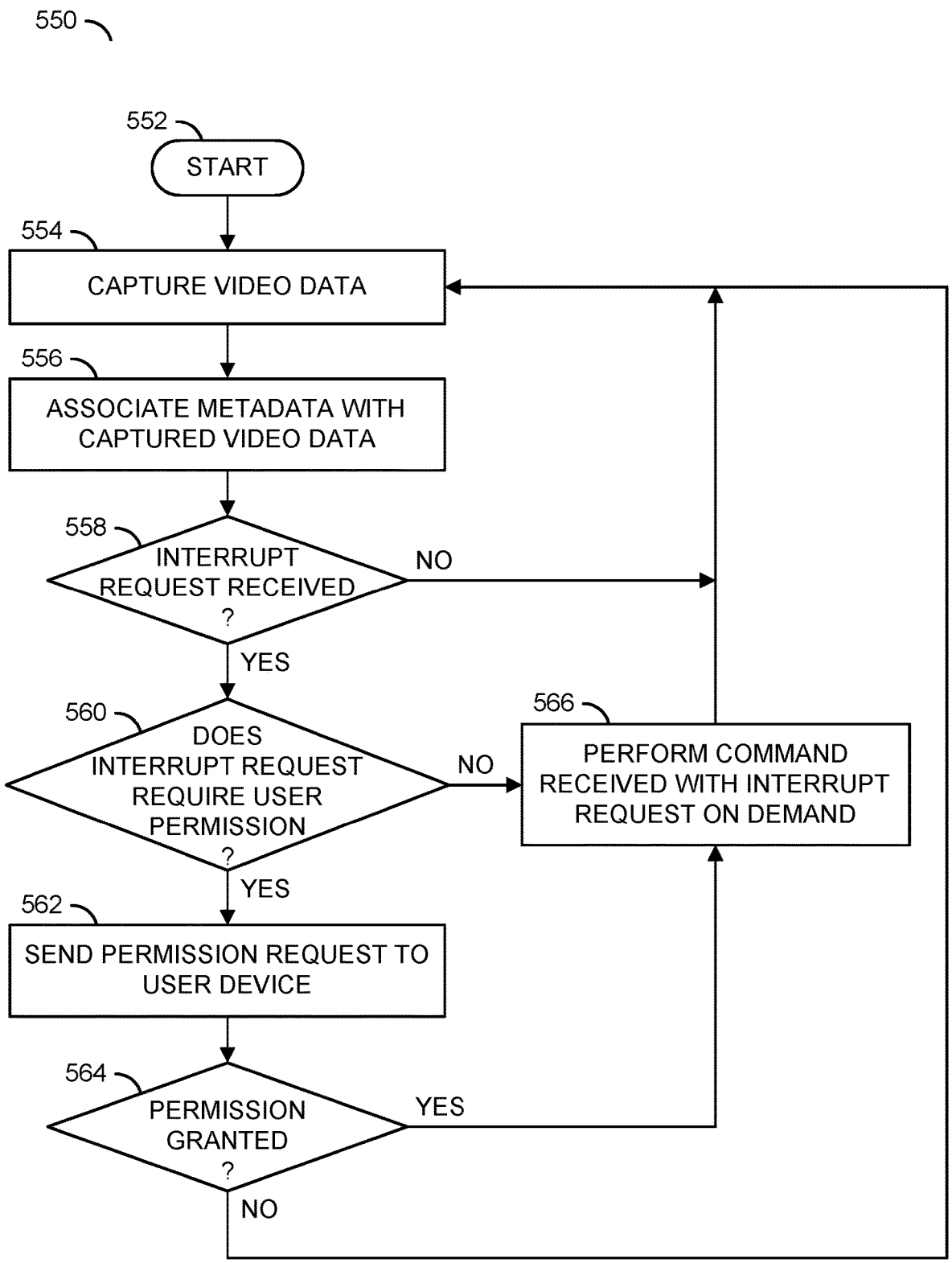
FIG. 11 is a flow diagram illustrating a method for responding to an interrupt request.

Referring to FIG. 11, a method (or process) 550 is shown. The method 550 may respond to an interrupt request. The method 550 generally comprises a step (or state) 552, a step (or state) 554, a step (or state) 556, a decision step (or state) 558, a decision step (or state) 560, a step (or state) 562, a decision step (or state) 564, and a step (or state) 566.

The state 552 may start the method 550. In the state 554, the capture devices 110a-110n may capture the video data. In the state 556, the circuits 114a-114n may associate metadata with the captured video data. Next, the method 550 may move to the decision state 558.

In the decision state 558, the circuits 114a-114n may determine whether an interrupt request has been received (e.g., the signal INTR). If the signal INTR has not been received, the method 550 may return to the state 554. If the signal INTR has been received, the method 558 may move to the decision state 560.

In the decision state 560, the circuits 114a-114n may determine whether the interrupt request requires user permission. In an example, to enable live streaming the data provider user may need to provide consent. If the interrupt request does not require user permission, the method 550 may move to the state 566. If the interrupt request does require user permission, the method 550 may move to the state 562. In the state 562, the permission request may be sent to the corresponding one of the user devices 112a-112n. For example, the user devices 112a-112n may provide an interface to enable the data provider user to grant and/or deny permission (e.g., a hands-free interface such as a voice command to prevent driver distraction). Next, the method 550 may move to the decision state 564.

In the decision state 564, the user devices 112a-112n may determine whether permission has been granted by the data provider user (e.g., the permission response may be transmitted to the circuits 114a-114n). If the permission has not been granted, the method 550 may return to the state 554. If the permission has been granted, the method 550 may move to the state 566. In the state 566, the circuits 114a-114n may perform the command received with the interrupt request signal INTR on demand. Next, the method 550 may return to the state 554.

In some embodiments, the signal INTR may be configured to change a mode of operation of the capture devices 110a-110n to enable live streaming. In one example, the signal INTR may provide a command to record at a different resolution and/or a different frame rate. In another example, the signal INTR may provide a command to change encoding parameters for the video recording. Interrupt requests for changing resolution, frame rate and/or encoding parameters may be provided to make real time streaming possible.

In some embodiments, the signal INTR may comprise a notification that may be sent to the user devices 112a-112n. In one example, the notification may request real time streaming mode be initiated. The data provider user may have to take action to configure the user devices 112a-112n to connect to the capture devices 110a-110n over Wi-Fi to allow greater bandwidth for streaming. In some embodiments, the data provider user may be provided an incentive (e.g., a fee) for changing the mode for live streaming. If the data provider user accepts, the properties of the capture devices 110a-110n may be changed remotely before or after the data provider user initiates a Wi-Fi connection to the capture devices 110a-110n.

Figure 12:
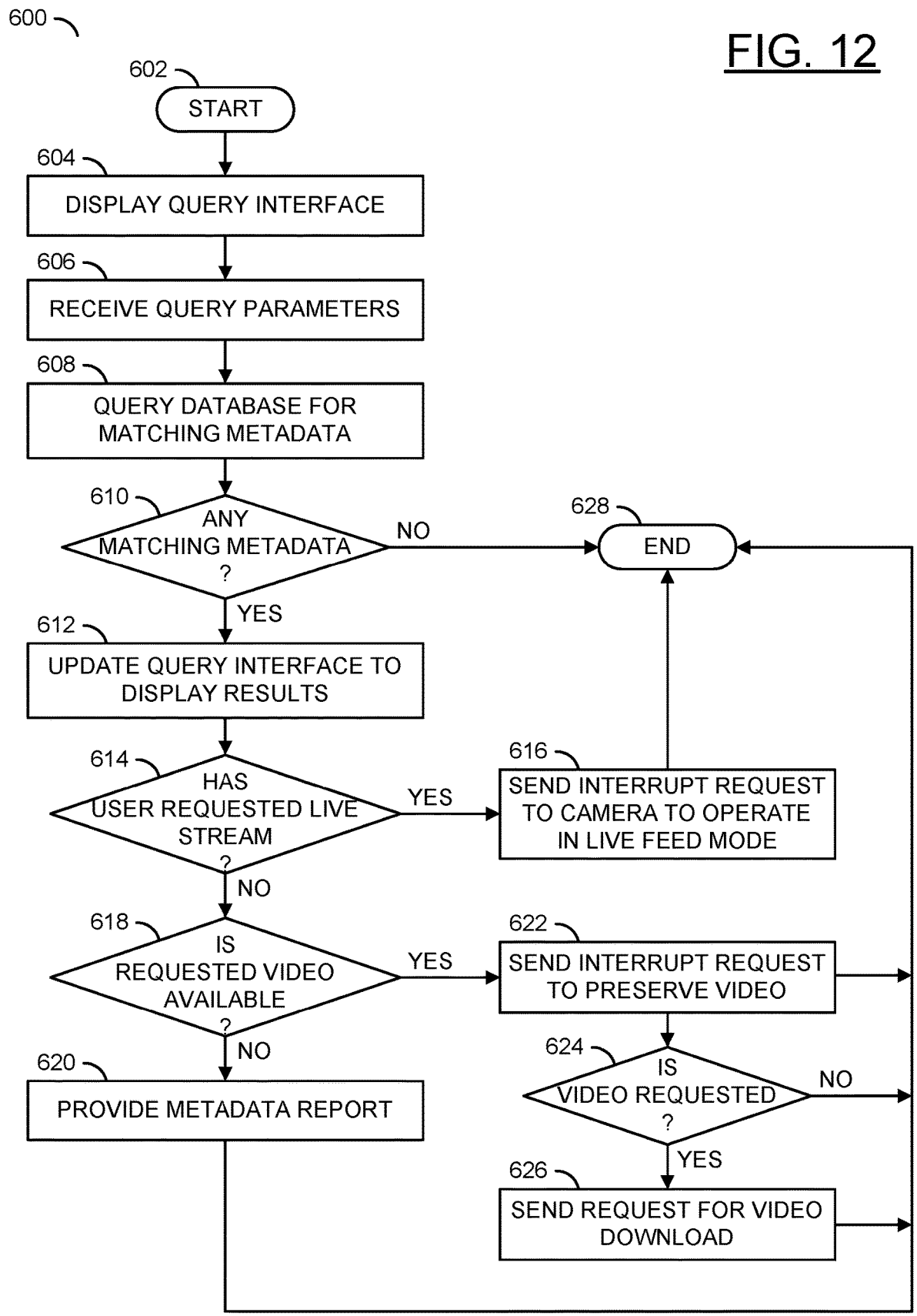
FIG. 12 is a flow diagram illustrating a method for determining a response to a query.

Referring to FIG. 12, a method (or process) 600 is shown. The method 600 may determine a response to a query. The method 600 generally comprises a step (or state) 602, a step (or state) 604, a step (or state) 606, a step (or state) 608, a decision step (or state) 610, a step (or state) 612, a decision step (or state) 614, a step (or state) 616, a decision step (or state) 618, a step (or state) 620, a step (or state) 622, a decision step (or state) 624, a step (or state) 626, and a step (or state) 628.

The state 602 may start the method 600. In the state 604, one of the subscriber devices 100a-100n may display the query interface 300. For example, the subscriber devices 100a-100n may be configured to perform the computer readable instructions implemented by the app 102a to generate the interface 300. Next, in the state 606, the database 130 may receive the query parameters (e.g., the signal QUERY) from one of the subscriber devices 100a-100n. In the state 608, the database 130 may be queried to search for the metadata 184a-184n (or the general metadata 184a'-184n') that may match the query parameters. Next, the method 600 may move to the decision state 610.

In the decision state 610, the database 130 may determine whether there is any matching metadata corresponding to the signal QUERY. If there is not matching metadata, the method 600 may move to the state 628. If there is matching metadata, the method 600 may move to the state 612. In the state 612, the interface 300 may be updated to display the search results 390a-390n. For example, the database 130 may generate the signal RESULT, and the corresponding one of the subscriber devices 100a-100n may be configured to update the interface 300 based on the signal RESULT. Next, the method 600 may move to the decision state 614.

In the decision state 614, the server 120 may determine whether the subscriber user has requested a live stream. For example, the subscriber user may request a live stream on the interface 300" and the subscriber devices 100a-100n may be configured to generate the signal VREQ to request the live stream. If the subscriber user has requested the live stream, the method 600 may move to the state 616. In the state 616, the server 120 may generate the signal INTR to send an interrupt request to a corresponding one of the capture devices 110a-110n to request that the capture devices 110a-110n operate in a live feed (e.g., video streaming) mode. Next, the method 600 may move to the state 628. In the decision state 614, if the subscriber user has not requested the live stream, the method 600 may move to the decision state 618.

In the decision state 618, the database 130 may determine whether the requested video is available. For example, the database 130 may check the expiration flag 184n of the corresponding one of the clips 182a-182n of the corresponding one of the license plate entries 180a-180n (or the other metadata 160) to determine whether the requested video is still stored on one of the capture devices 110a-110n. If the requested video is not available, the method 600 may move to the state 620. In the state 620, the server 120 may provide a metadata report. For example, the signal META may be transmitted to the subscriber device 100a-100n of the subscriber user making the request. Next, the method 600 may move to the state 628.

In the decision state 618, if the requested video is available, the method 600 may move to the state 622. In the state 622, the server 120 may send the signal INTR to the corresponding one of the capture devices 110a-110n to request that the video be preserved. Next, the method 600 may move to the decision state 624.

In the decision state 624, the server 120 may determine whether one of the video recording has been requested by the subscriber user. For example, one of the subscriber devices 100a-100n may generate the signal VREQ in response to the subscriber user requesting one of the video recordings on the interface 300. If one of the video recordings is not requested, the method 600 may move to the state 628. If one of the video recordings is requested, the method 600 may move to the state 626. In the state 626, the server 120 may send the request for the video download (e.g., transmit the signal VREQ to the corresponding one of the capture devices 110a-110n via the user devices 112a-112n). For example, the server 120 may determine which of the capture devices 110a-110n to send the video request to based on the device ID of the requested clip 182a-182n stored in the metadata 184a-184n. Next, the method 600 may move to the state 628. The state 628 may end the method 600.

In some embodiments, if the search results 390a-390n are displayed to the subscriber user on the interface 300 and indicate that indicate the video is available for a given query hit, then the videos corresponding to the search results 390a-390n may be preserved on the local device (e.g., the capture devices 110a-110n) by sending the interrupt request signal INTR. For example, the subscriber user may log off the system 50 and then at a later time log onto the system 50 again with a decision to download the video and the video may be available because the video has been preserved. The act of preserving the video and uploading the video may not happen at the same time and may be two different events. For example, requesting the video may cost the subscriber user additional funds and the subscriber user may want to see if there is video available before giving approval to purchase the video. For example, an insurance investigator may need internal approval before paying for a video and businesses may not be timely with approval. Generally, automatically downloading the video with each search hit may have a cost in terms of data plan usage, driver smartphone performance and/or database storage. Uploading the videos on demand based on the request from the subscriber user may improve data and/or cost efficiency.

Figure 13:
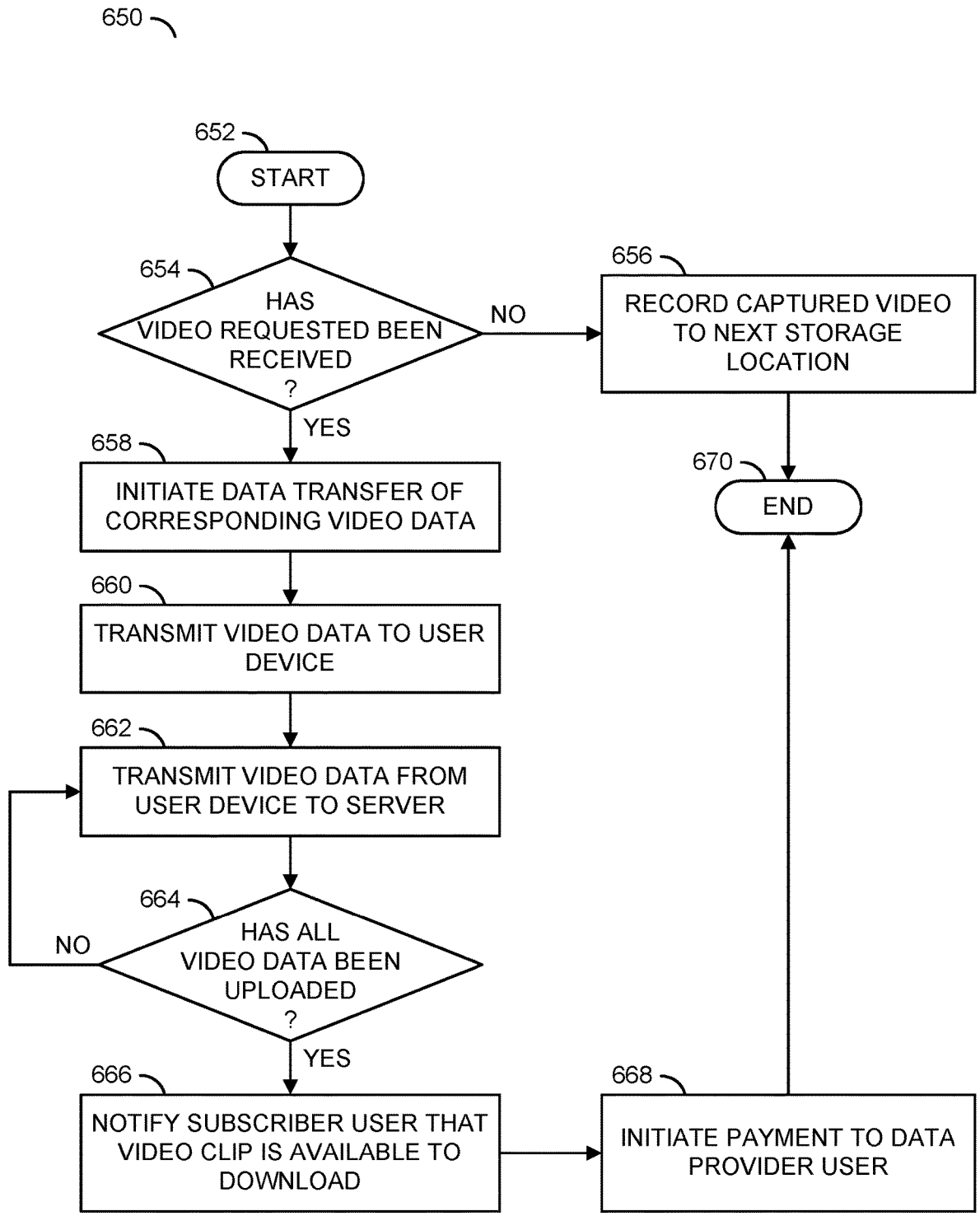
FIG. 13 is a flow diagram illustrating a method for transmitting video data via a wireless communication device.

Referring to FIG. 13, a method (or process) 650 is shown. The method 650 may transmit video data via the wireless communication devices 112a-112n. The method 650 generally comprises a step (or state) 652, a decision step (or state) 654, a step (or state) 656, a step (or state) 658, a step (or state) 660, a step (or state) 662, a decision step (or state) 664, a step (or state) 666, a step (or state) 668, and a step (or state) 670.

The state 652 may start the method 650. Next, the method 650 may move to the decision state 654. In the decision state 654, one of the capture devices 110a-110n may determine whether a video request has been received. For example, the capture devices 110a-110n may determine whether the signal VREQ has been received. If the signal VREQ has not been received, the method 650 may move to the state 656. In the state 656, the circuits 114a-114n may record captured video (e.g., newly recorded video) to a next storage location. For example, the next storage location may be a next available storage location if free space is available in memory. In another example, the next available location may be a location in memory storing the oldest unpreserved video, when free space is unavailable (e.g., first in data may be overwritten first). Next, the method 650 may move to the state 670.

In the decision state 654, if the signal VREQ has been received, the method 650 may move to the state 658. In the state 658, the capture devices 110a-110n may initiate a data transfer of the video data corresponding to the video requested in the signal VREQ. Next, in the state 660, the capture devices 110a-110n may transmit the video data (e.g., the signal VIDEO) to the corresponding one of the user devices 112a-112n. In the state 662, the user devices 112a-112n may transmit the video data (e.g., the portions of the video data VIDEO_TR) to the server 120. Next, the method 650 may move to the decision state 664.

In the decision state 664, the user devices 112a-112n may determine whether all the video data has been uploaded. For example, the signal VIDEO_TR may comprise portions of the video data received in the signal VIDEO and the portions may be uploaded as a low priority and/or intermittently. If all the video data has not been uploaded, the method 650 may return to the state 662. If all the video data has been uploaded, the method 650 may move to the state 666. In the state 666, the server 120 may notify the subscriber user that the video clip is available to download. For example, the signal DATA may be a notification that provides a download link to the video data on the subscriber devices 100a-100n. Next, in the state 668, the subscriber user may initiate a payment for the video to the data provider user. For example, the signal DATA may comprise payment information (e.g., bank information, payment option selected, payment amount, etc.). Next, the method 650 may move to the state 670. The state 670 may end the method 650.

Figure 14:
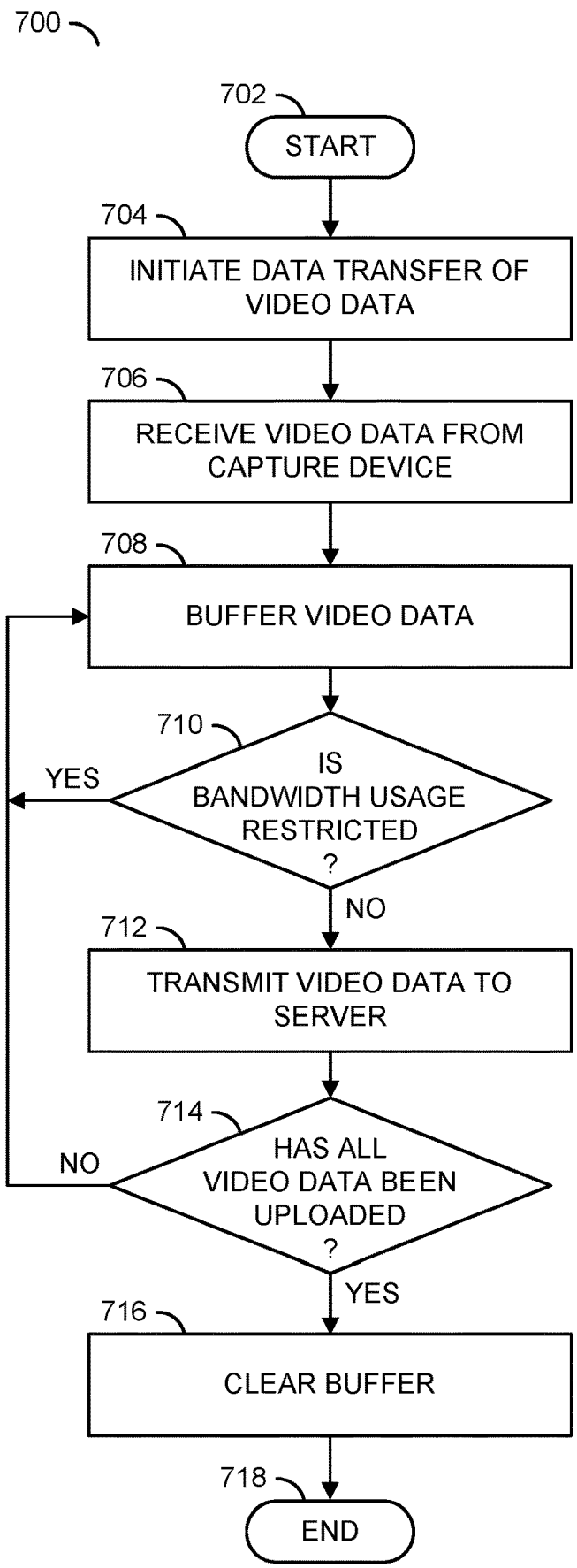
FIG. 14 is a flow diagram illustrating a method for buffering video data in response to a restriction.

Referring to FIG. 14, a method (or process) 700 is shown. The method 700 may buffer video data in response to a restriction. The method 700 generally comprises a step (or state) 702, a step (or state) 704, a step (or state) 706, a step (or state) 708, a decision step (or state) 710, a step (or state) 712, a decision step (or state) 714, a step (or state) 716, and a step (or state) 718.

The state 702 may start the method 700. In the state 704, one of the capture devices 110a-110n and/or one of the user devices 112a-112n may initiate data transfer of the video data (e.g., the signal VIDEO). Next, in the state 706, one of the user devices 112a-112n may receive the signal VIDEO from one or more of the capture devices 110a-110n. In the state 708, the user devices 112a-112n may buffer the video data (e.g., temporarily store the video data in the buffer 430). Next, the method 700 may move to the decision state 710.

In the decision state 710, the user devices 112a-112n may determine whether bandwidth usage is restricted. For example, restricted bandwidth usage may comprise a data cap (e.g., a data usage quota) imposed by an incumbent local exchange carrier, bandwidth throttling (e.g., reduced data transfer rate), a user preference and/or higher priority data available to transfer. If the bandwidth usage is restricted, the method 700 may return to the state 708. If the bandwidth usage is not restricted, the method 700 may move to the state 712.

In the state 712, the user devices 112a-112n may transmit the video data to the server 120 (e.g., the signal VIDEO_TR may be transmitted to the network 60, then the network 60 may transmit the signal VIDEO to the server 120). Next, method 700 may move to the decision state 714. In the decision state 714, the user devices 112a-112n may determine whether all the video data has been uploaded. If all the video data has not been uploaded, the method 700 may return to the state 708. If all the video data has been uploaded, the method 700 may move to the state 716. In the state 716, the user devices 112a-112n may clear the respective buffers 430a-430n (e.g., remove the stored video data and/or return the allocated storage to the heap from temporary storage). Next, the method 700 may move to the state 718. The state 718 may end the method 700.

Generally, the data provider may passively record video to one or more of the capture devices 110a-110n. In real time, along with the video capture, the circuits 114a-114n may capture metadata (e.g., license plate characters, GPS, time, direction, etc.). The metadata (e.g., the signal META) may be transferred from the capture devices 110a-110n at various time intervals (e.g., above every 15 seconds) to the wireless communication devices 112a-112n (e.g., over a Bluetooth connection). The capture devices 110a-110n may transfer the ID of file that may be overwritten next to the wireless communication devices 112a-112n (e.g., the signal ID_EXP). The wireless communication devices 112a-112n may transfer the signal META and/or the signal ID_EXP (e.g., using Wi-F, using 3G/4G/LTE/5G, etc.) to the network 60 and/or the server 120 for storage in the database 130. The database 130 and/or the server 120 may send commands to the capture devices 110a-110n (e.g., directly via the network 60, and/or via the user devices 112a-112n). For example, the commands may comprise a request to perform an on-demand request a particular video file, an on-demand request for a video file to be preserved longer than usual (or forever until flag is removed), an on-demand request to enter a streaming mode and/or an on-demand request to send data metrics and/or payment information to the smartphone app.

Generally, the subscriber users may interact with the interface 300 to query the database 130 for a license plate number, a location, a time and/or information to monitor a current location of a driver. The subscriber user may request video files from matches and/or receive report on hits of time and/or location of a driver. The subscriber user may request to view a streaming mode.

The functions and structures illustrated in the diagrams of FIGS. 1 to 14 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
a capture device configured to (i) capture video, (ii) store said captured video, (iii) implement video analysis to (a) perform object detection on said captured video and (b) generate metadata from said captured video based on said object detection and (iv) communicate with a wireless communication device; and
a database configured to (i) communicate with said wireless communication device, (ii) store said metadata received from said wireless communication device without receiving said captured video, (iii) search said metadata to generate search results in response to search parameters provided by a user, (iv) provide said user a list of video clips that correspond to said search results, and (v) generate an interrupt signal in response to said search results, wherein
(A) said metadata is uploaded to said database without said captured video before a request by said user is received,
(B) said user submits said request for one of said video clips by selecting from said list of said video clips provided by said search results,
(C) said capture device transmits said one of said video clips requested to said database via said wireless communication device in response to said request by said user,
(D) each of said video clips comprise a portion of said captured video corresponding to said search results,
(E) said capture device performs an overwrite of said video clips captured from an earlier time in response to said captured video captured at a later time based on available storage capacity,
(F) said interrupt signal is presented to said capture device if at least one of said video clips on said list of said video clips corresponds to said metadata that was received from said capture device, and
(G) said capture device prevents said overwrite of said video clip in response to said interrupt signal.

2. The system according to claim 1, wherein said wireless communication device is configured to communicate with a plurality of said capture devices.

3. The system according to claim 1, wherein said capture device (i) is installed in a vehicle as a dashboard camera, (ii) a field of view of said capture device is configured to capture a view from said vehicle and (iii) said wireless communication device is a smartphone.

4. The system according to claim 1, wherein said capture device is installed as a security camera at a stationary location.

5. The system according to claim 1, wherein said system further comprises a plurality of said capture devices, each of said capture devices are (i) configured to provide said metadata to said system and (ii) connected to one of a plurality of said wireless communication devices.

6. The system according to claim 1, wherein said metadata comprises alphanumeric characters and symbols extracted from said captured video for determining license plate recognition information.

7. The system according to claim 1, wherein said metadata comprises at least one of a time of capture of said captured video, a date of capture of said captured video, location coordinates of said capture of said captured video, a direction of a field of view of said capture device, an altitude of said capture of said captured video, an identification number of said capture device, an expiration status of said captured video, characteristics of roadway features and characteristics of objects detected in said captured video.

8. The system according to claim 1, further comprising an interface configured to (i) enable a query of said database by said user based on said metadata and (ii) present said search results to said user.

9. The system according to claim 8, wherein said interface is implemented as at least one of (i) an app on a communication device and (ii) a web-based application.

10. The system according to claim 8, wherein (i) said interface comprises a map view and (ii) said map view comprises visual indicators of locations of vehicles based on (a) said search results and (b) said metadata.

11. The system according to claim 1, wherein (i) said metadata comprises object metadata generated in response to said object detection and sensor metadata generated in response to sensor data and (ii) said object metadata and said sensor metadata are provided to said user when said capture device has performed said overwrite of said captured video that corresponds to said video clips.

12. The system according to claim 1, wherein (i) Bluetooth communication is implemented by said capture device to communicate with said wireless communication device and (ii) said wireless communication device is configured to forward data from said capture device to said database.

13. The system according to claim 1, wherein said wireless communication device is configured to implement at least one of Wi-Fi communication, 5G communication, 4G communication, 3G communication and LTE communication to connect to a network.

14. The system according to claim 1, wherein said wireless communication device is configured to forward (i) said metadata generated from said captured video by said capture device from said capture device to said database, (ii) said request from said database to said capture device and (iii) on demand in response to said request, said video clips requested from said capture device to said database.

15. The system according to claim 1, wherein (i) said capture device is configured to generate an expire notification in response to said overwrite, (ii) said wireless communication device is configured to forward said expire notification to said database, (iii) said expire notification comprises an identification of said captured video that has been overwritten by said capture device, (iv) said database is configured to indicate to said user in said search results that said database will transmit (a) said one of said video clips requested if said expire notification has not been received for said captured video and (b) said metadata that corresponds to said one of said video clips requested if said expire notification has been received for said captured video.

16. The system according to claim 1, wherein (i) said video analysis performed by said capture device is further configured to determine object data in said captured video in real-time in response to said object detection, (ii) said capture device is further configured to (a) create a metadata record for each of said video clips based on said metadata generated and (b) compress and encrypt said metadata.

17. The system according to claim 1, wherein said wireless communication device is configured to (i) buffer said captured video received from said capture device and (ii) delay transmission of said captured video to a network based on at least one of a connection type and a bandwidth restriction.

18. The system according to claim 1, wherein uploading portions of said captured video on demand as said video clips associated with said metadata in response to said request is configured to improve data and cost efficiency compared to uploading all of said captured video.

19. The system according to claim 1, wherein preventing said overwrite of said video clip in response to said interrupt signal ensures that said video clip is available for a predetermined amount of time to enable said user to decide to pay for receiving said video clip at a later time.

20. The system according to claim 1, wherein said capture device prevents said overwrite of said video clip for two days in response to said interrupt signal.

* * * * *